US010824406B2

(12) United States Patent
McFarland

(10) Patent No.: US 10,824,406 B2
(45) Date of Patent: Nov. 3, 2020

(54) PARSING SOURCE CODE INTO A LINEAR ARRAY

(71) Applicant: Assurant Design Automation LLC, Kennesaw, GA (US)

(72) Inventor: M. David McFarland, Kennesaw, GA (US)

(73) Assignee: Assurant Design Automation LLC, Kennesaw, GA (US)

( * ) Notice: Subject to any disclaimer, the term of this patent is extended or adjusted under 35 U.S.C. 154(b) by 0 days.

(21) Appl. No.: 16/549,947

(22) Filed: Aug. 23, 2019

(65) Prior Publication Data

US 2019/0384583 A1 Dec. 19, 2019

Related U.S. Application Data

(63) Continuation of application No. 16/007,689, filed on Jun. 13, 2018, now Pat. No. 10,402,175, which is a continuation-in-part of application No. 14/727,555, filed on Jun. 1, 2015, now abandoned.

(51) Int. Cl.
*G06F 8/41* (2018.01)
*G06F 8/51* (2018.01)

(52) U.S. Cl.
CPC .............. *G06F 8/427* (2013.01); *G06F 8/41* (2013.01); *G06F 8/51* (2013.01)

(58) Field of Classification Search
CPC ....................................................... G06F 8/427
USPC ....................................................... 717/143
See application file for complete search history.

(56) References Cited

U.S. PATENT DOCUMENTS

| | | | |
|---|---|---|---|
| 4,065,915 | A | 1/1978 | Farnbach |
| 6,215,327 | B1 | 4/2001 | Lyke |
| 6,628,215 | B2 | 9/2003 | Talwar et al. |
| 6,654,950 | B1 | 11/2003 | Barnishan |
| 6,898,563 | B1 | 5/2005 | McFarland |
| 7,346,864 | B2 | 3/2008 | Srouji et al. |
| 7,605,607 | B2 | 10/2009 | Ng |
| 7,784,005 | B1 | 8/2010 | Ng |
| 7,890,896 | B2 | 2/2011 | Moon |
| 8,739,084 | B2 | 5/2014 | Swann |
| 9,112,490 | B1 | 8/2015 | Hamlet et al. |

(Continued)

OTHER PUBLICATIONS

U.S. Appl. No. 16/043,031, Office Action Summary, dated Jun. 1, 2020, pp. 1-27.

(Continued)

*Primary Examiner* — Chat C Do
*Assistant Examiner* — Bradford F Wheaton
(74) *Attorney, Agent, or Firm* — Kunzler Bean & Adamson

(57) ABSTRACT

For parsing source code into a linear array, a method parses source code into a plurality of logic design elements. The method further identifies conditional logic for each logic design element. In addition, the method identifies computation logic for each logic design element. The method encodes each logic design element as a logic state of a plurality of logic states in a linear array. Each logic state includes one or more binary output variables, one or more binary input variables, one or more minterms of the one or more binary input variables, one or more maxterms of the one or more minterms, one or more present state values, and one or more next state values. The method reduces the logic relationships to a Boolean equation. The method generates one of output source code and a hardware implementation from the Boolean equation.

17 Claims, 37 Drawing Sheets

(56) References Cited

U.S. PATENT DOCUMENTS

| | | | |
|---|---|---|---|
| 9,396,298 | B1 | 7/2016 | McFarland |
| 9,535,665 | B2 | 1/2017 | McFarland |
| 9,536,029 | B2 | 1/2017 | McFarland |
| 9,590,858 | B2 | 3/2017 | McFarland |
| 2001/0044708 | A1 | 11/2001 | Talwar et al. |
| 2006/0095824 | A1 | 5/2006 | McGrath |
| 2007/0011113 | A1 | 1/2007 | Mosleh et al. |
| 2007/0118339 | A1 | 5/2007 | Moon |
| 2009/0204931 | A1 | 8/2009 | Lim et al. |
| 2010/0229132 | A1 | 9/2010 | Gu |
| 2010/0251201 | A1 | 9/2010 | Chin et al. |
| 2013/0019215 | A1 | 1/2013 | Swann |
| 2013/0125104 | A1 | 5/2013 | Valluri et al. |
| 2014/0085979 | A1 | 3/2014 | Kono |
| 2016/0350087 | A1 | 12/2016 | McFarland |
| 2016/0350447 | A1 | 12/2016 | McFarland |
| 2016/0350448 | A1 | 12/2016 | McFarland |
| 2016/0350449 | A1 | 12/2016 | McFarland |
| 2016/0350450 | A1 | 12/2016 | McFarland |
| 2016/0350668 | A1 | 12/2016 | McFarland |
| 2018/0253513 | A1 | 9/2018 | McFarland |
| 2018/0330023 | A1 | 11/2018 | McFarland |
| 2018/0330024 | A1 | 11/2018 | McFarland |
| 2018/0330025 | A1 | 11/2018 | McFarland |
| 2018/0330026 | A1 | 11/2018 | McFarland |

OTHER PUBLICATIONS

S. Mohamed et al., "Visual Interfaces for High Level Hardware Synthesis", Proceedings of the working conference on Advanced visual interfaces, May 1998, pp. 277-279.

150

| Logic Transformation ID |
| :---: |
| 155 |
| Binary Output Variables |
| 225 |
| Next State Values |
| 230 |
| Input Data |
| 160 |
| Input Data |
| 160 |
| Input Data |
| 160 |

160

| Input ID |
| :---: |
| 165 |
| Binary Input Variable |
| 215 |
| Binary Input Variable |
| 215 |
| Binary Input Variable |
| 215 |

170

| Logic Element ID |
| --- |
| 450 |
| Assertion Indicator |
| 295 |
| Assertion Value |
| 290 |

175

| Connection ID |
| --- |
| 255 |
| Source Field |
| 260 |
| Destination Field |
| 265 |
| Field Assertion Indicator Data |
| 170 |

185

| Logic Element ID 450 |
| Logic Element Type 455 |
| Input IDs 456 |
| Output IDs 457 |
| Partition ID 459 |
| Execution Time 377 |
| Package ID 461 |

151 

```
┌─────────────────────────────────┐
│   Logic Transformation ID       │
│              155                │
├─────────────────────────────────┤
│   Binary Output Variables       │
│              225                │
├─────────────────────────────────┤
│     Next State Values           │
│              230                │
├─────────────────────────────────┤
│         Input Data              │
│              160                │
├─────────────────────────────────┤
│        Do Care Array            │
│              139                │
├─────────────────────────────────┤
│       State Variables           │
│              133                │
├─────────────────────────────────┤
│    Present State Values         │
│              220                │
├─────────────────────────────────┤
│ Callable Source Code Parameters │
│              137                │
├─────────────────────────────────┤
│    Binary Input Variables       │
│              215                │
└─────────────────────────────────┘
```

FIG. 2L

| | Present State Value 220 | Binary Input Variable Instance 215 | Binary Output Variable 225 | Next State Value 230 |
|---|---|---|---|---|
| 152 | Present State Value 220 | Binary Input Variable Instance 215 | Binary Output Variable 225 | Next State Value 230 |
| 152 | Present State Value 220 | Binary Input Variable Instance 215 | Binary Output Variable 225 | Next State Value 230 |
| ... | | | | |
| 152 | Present State Value 220 | Binary Input Variable Instance 215 | Binary Output Variable 225 | Next State Value 230 |

| | |
|---|---|
| 152 | Logic State 205 |
| 152 | Logic State 205 |
| ... | |
| 152 | Logic State 205 |

FIG. 2N

| State Variable 133 | State Variable 133 | State Variable 133 | State Variable 133 | State Variable 133 |
|---|---|---|---|---|

FIG. 2O

Production Array

157

| Present State Value 220 | Binary Input Variable Instance 215 | Binary Output Variable 225 | Next State Value 230 |
|---|---|---|---|
| Present State Value 220 | Binary Input Variable Instance 215 | Binary Output Variable 225 | Next State Value 230 |
| Present State Value 220 | Binary Input Variable Instance 215 | Binary Output Variable 225 | Next State Value 230 |

152 (for each row)

FIG. 2Q

```
344 ──<Begin_Block_A>
172 ──Swtich (Binary_Input_Values+Current_State) {
348 ──<Alt_Dest:Block_F>
346 ──<End_Block_B>

344 ──<Begin_Block_B>
172 ──Case 'Inputs00+State00' :
        Binary_Output_Variable = Outputs00;
        Next_State = Next_State01;
348 ──<Alt_Dest:Block_C>
        Break;
346 ──<End_Block_B>

344 ──<Begin_Block_C>
172 ──Case 'Inputs01+State00' :
        Binary_Output_Variable = Outputs01;
        Next_State = Next_State02;
348 ──<Alt_Dest:Block_D>
        Break;
346 ──<End_Block_C>

344 ──<Begin_Block_D>
172 ──Case 'InputsDC+State01' :
        Binary_Output_Variable = Outputs03;
        Next_State = Next_State00;
348 ──<Alt_Dest:Block_E>
        Break;
346 ──<End_Block_D>

344 ──<Begin_Block_E>
172 ──Case 'Inputs04+State02' :
        Binary_Output_Variable = Outputs03
        Next_State = Next_State00;
348 ──<Alt_Dest:Block_F>
        Break;
346 ──<End_Block_E>
        }
346 ──<End_Block_A>

344 ──<Begin_Block_F>
```

PARSING SOURCE CODE INTO A LINEAR ARRAY

CROSS-REFERENCE TO RELATED APPLICATIONS

This is a continuation of and claims priority to U.S. patent application Ser. No. 16/007,689 entitled "PARSING SOURCE CODE INTO A LINEAR ARRAY" filed on Jun. 13, 2018 for M. David McFarland, which is incorporated herein by reference, and which is a continuation-in-part application that claims priority to U.S. patent application Ser. No. 14/727,555 entitled "PARSING SOURCE CODE INTO A LINEAR ARRAY" and filed on Jun. 1, 2015 for M. David McFarland, which is incorporated herein by reference.

BACKGROUND

Field

The subject matter disclosed herein relates to a linear array and more particularly relates to parsing source code into a linear array.

Description of the Related Art

The source code for a logic design defines logic elements and logic element relationships. However, the complexity of the logic design may increase exponentially with the number of logic elements.

BRIEF SUMMARY

A method for parsing source code into a linear array is disclosed. The method parses source code of a multidimensional logical array logic design into a plurality of logic design elements. The method further identifies conditional logic for each logic design element from the parsed source code. In addition, the method identifies computation logic for each logic design element from the parsed source code. The method identifies one or more next state values for each logic design element from the parsed source code. In addition, the method encodes each logic design element of the multidimensional logical array logic design as a logic state of a plurality of logic states in a linear array by assigning one or more present state values and the conditional logic for each logic design element to each corresponding logic state, each logic state comprising one or more binary output variables, one or more binary input variables, one or more minterms of the one or more binary input variables, one or more maxterms of the one or more minterms, the one or more present state values, and the one or more next state values, wherein the plurality of logic states are displayed as a plurality of fields in one or more combination maps. The method organizes the plurality of binary input variables into the plurality of fields in the one or more combination maps. The method identifies logic relationships of the logic design from relationship arrows in the one or more combination maps using the linear array. The method further resolves the logic relationships of the logic design using the one or more combination maps of the linear array. The method reduces the logic relationships of the logic design to a Boolean equation using the one or more combination maps. The method generates one of output source code and a hardware implementation from the Boolean equation. A program product and apparatus also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2L is a schematic block diagram illustrating one embodiment of a callable execution block;

FIG. 2M is a schematic block diagram illustrating one embodiment of an intermediate linear array;

FIG. 2N is a schematic block diagram illustrating one alternate embodiment of an intermediate linear array;

FIG. 2O is a schematic block diagram illustrating one embodiment of state variables;

FIG. 2Q is a schematic block diagram illustrating one embodiment of a production array;

FIG. 3E is a text illustration showing one embodiment of source code with delimiters;

FIG. 3H is a drawing illustrating one embodiment of generating an intermediate linear array from a combination map;

DETAILED DESCRIPTION

Figure 1A:
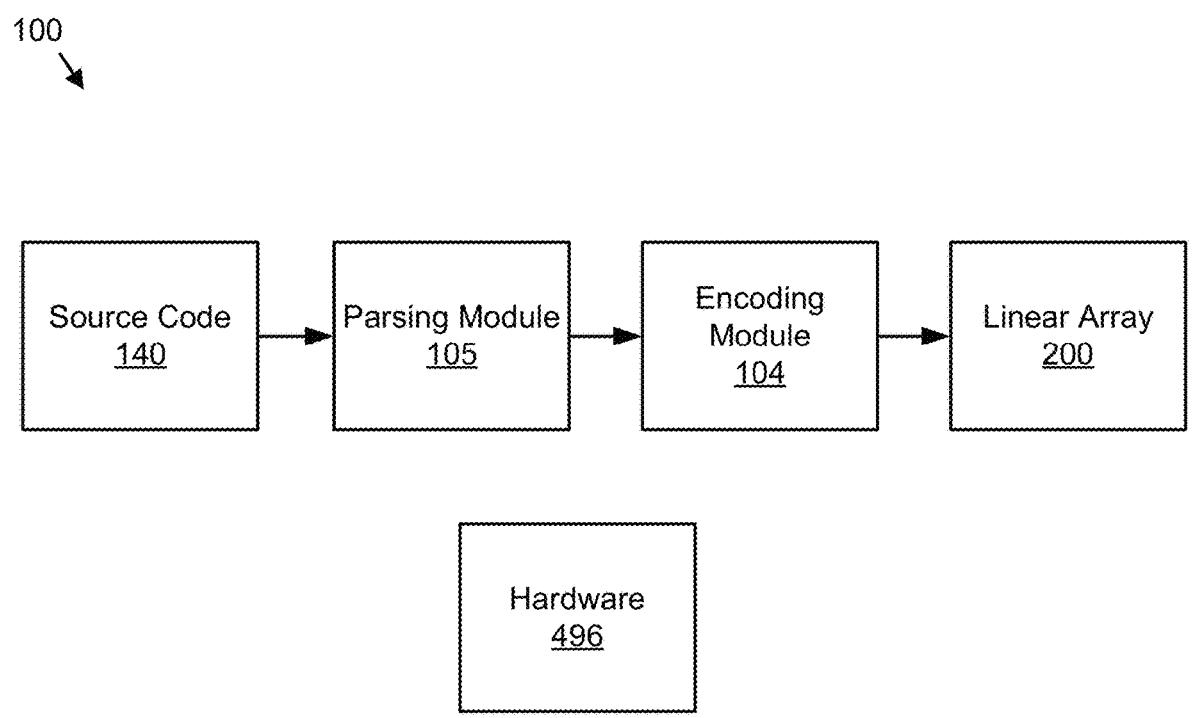
FIG. 1A is a schematic block diagram illustrating one embodiment of a source code parsing process.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage medium storing machine readable code, computer readable code, and/or program code, referred hereafter as code. The computer readable storage medium may be tangible, non-transitory, and/or non-transmission. The computer readable storage medium may not embody signals. In a certain embodiment, the storage devices only employ signals for accessing code.

The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Ada, Python, Ruby, Java, Smalltalk, C++, or the like, and conventional procedural programming languages, such as the "C" programming language, SQL, relay ladder logic, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a source code parsing process 100. The source code parsing process 100 may parse and encode source code of a source code 140 into a linear array 200. The source code 140 may describe logical operations that are implemented in hardware, implemented in software, implemented as abstract logic, or combinations thereof. The hardware may be semiconductor logic, discrete logic, relay logic, or combinations thereof.

The source code 140 typically specifies a plurality of inputs, conditions, actions, outputs, states and/or process flows, referred to hereinafter as logic elements. In addition, the source code 140 specifies some of the interactions between the logic elements, referred to herein as logic element relationships.

The source code 140 may be organized as source code. The source code may be compiled as executable code that is executed by a processor. For example, C++ source code may be compiled and executed by an embedded processor. Alternatively, the source code may be compiled and implemented in hardware. For example, Verilog source code may be compiled and implemented into a semiconductor design.

A source code 140 with even a moderate number of logic elements results in a large number of logic element relationships. The logic element relationships may be an exponential function of the number of logic elements. As a result, the source code 140 may be intractably complicated.

By encoding the source code 140 in the linear array 200, the complexity of the source code 140 is greatly reduced in the linear array 200. The linear array 200 may be more easily analyzed and manipulated.

The embodiments described parse the source code of the source code 140 with a parsing module 105. The encoding module 104 encodes the parsed source code as logic states of the linear array 200 as will be described hereafter. The linear array 200 may be employed to generate output source code that generates hardware 496. Alternatively, the linear array 200 may be employed to generate output source code that is compiled to operate the hardware 496 as will be described hereafter.

Figure 1B:
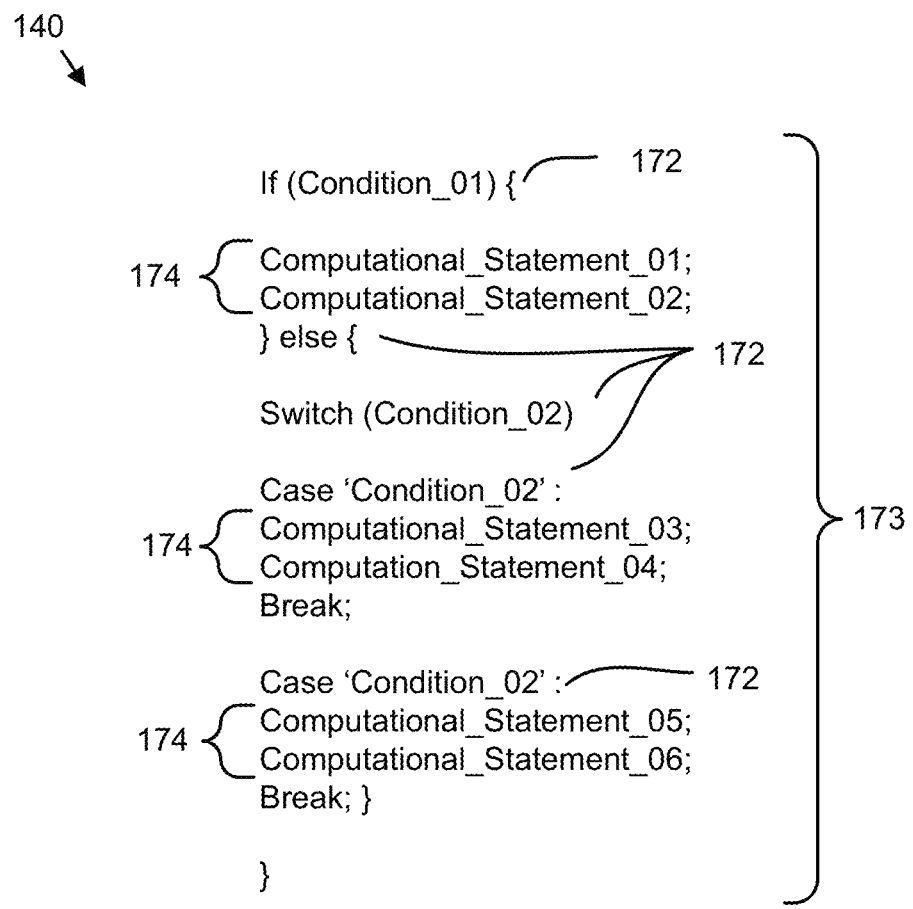
FIG. 1B is a text diagram illustrating one embodiment of a source code logic design.

FIG. 1B is a text diagram illustrating one embodiment of a source code source code 140. The source code source code 140 includes software lines of code (SLOC) 173 with conditional logic 172 that defines when various actions 174 are taken. In the depicted embodiment, the actions 174 are computational statements. The source code source code 140 may be compiled to generate instructions for a processor or the like.

Figure 1C:
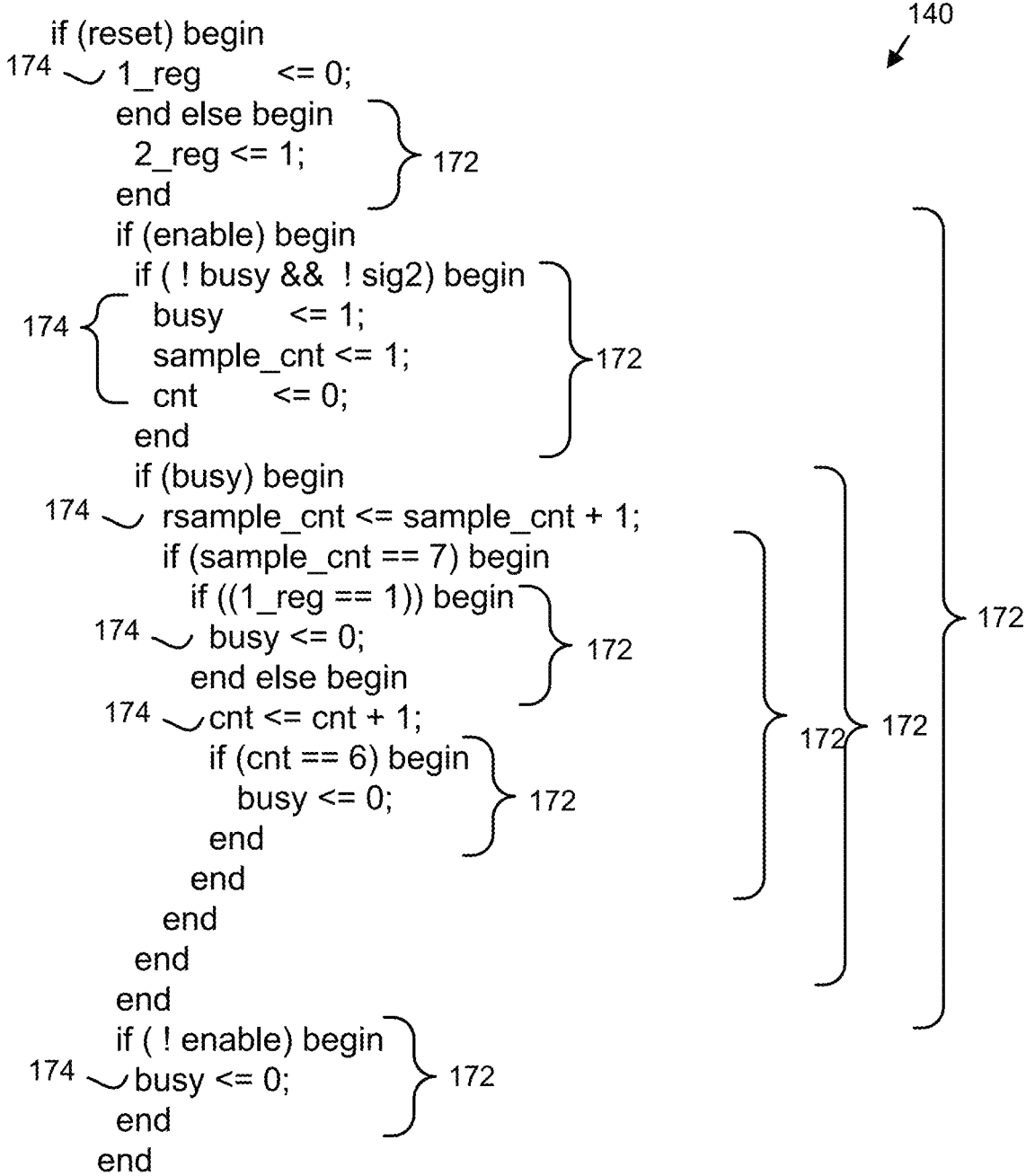
FIG. 1C is a schematic block diagram illustrating one embodiment of hardware source code.

FIG. 1C is a schematic block diagram illustrating one embodiment of a hardware source code source code 140. In the depicted embodiment, the hardware source code source code 140 is a Verilog file. The hardware source code source code 140 includes conditional logic 172 that defines when various actions 174 are taken. In the depicted embodiment, the actions 174 are computational statements. The hardware source code source code 140 may be compiled into a semiconductor device, a field programmable logic array (FPGA), or the like.

Figure 1D:
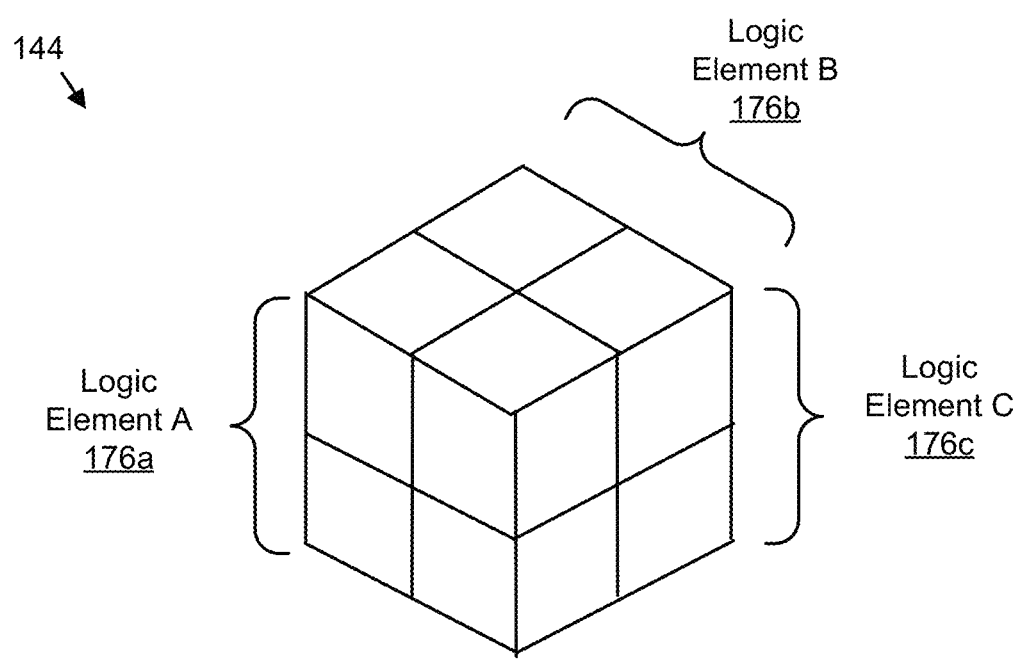
FIG. 1D is a drawing illustrating one embodiment of a multidimensional logical array.

FIG. 1D is a drawing illustrating one embodiment of a multidimensional logical array logic design 144 of the source code 140. For simplicity, the multidimensional logical array logic design 144 is shown for three logic elements 176. As shown, the multidimensional logic array logic design 144 for only three logic elements 176 results in $2^N$ or 8 logic element relationships. For even modest logic designs 140, the number of logic element relationships quickly becomes intractable. The embodiments described herein encode logic designs 140 such as those illustrated FIGS. 1B-C into the linear array 200. The linear array 200 may be examined to identify and define undefined logic element relationships as will be described hereafter.

Figure 1E:
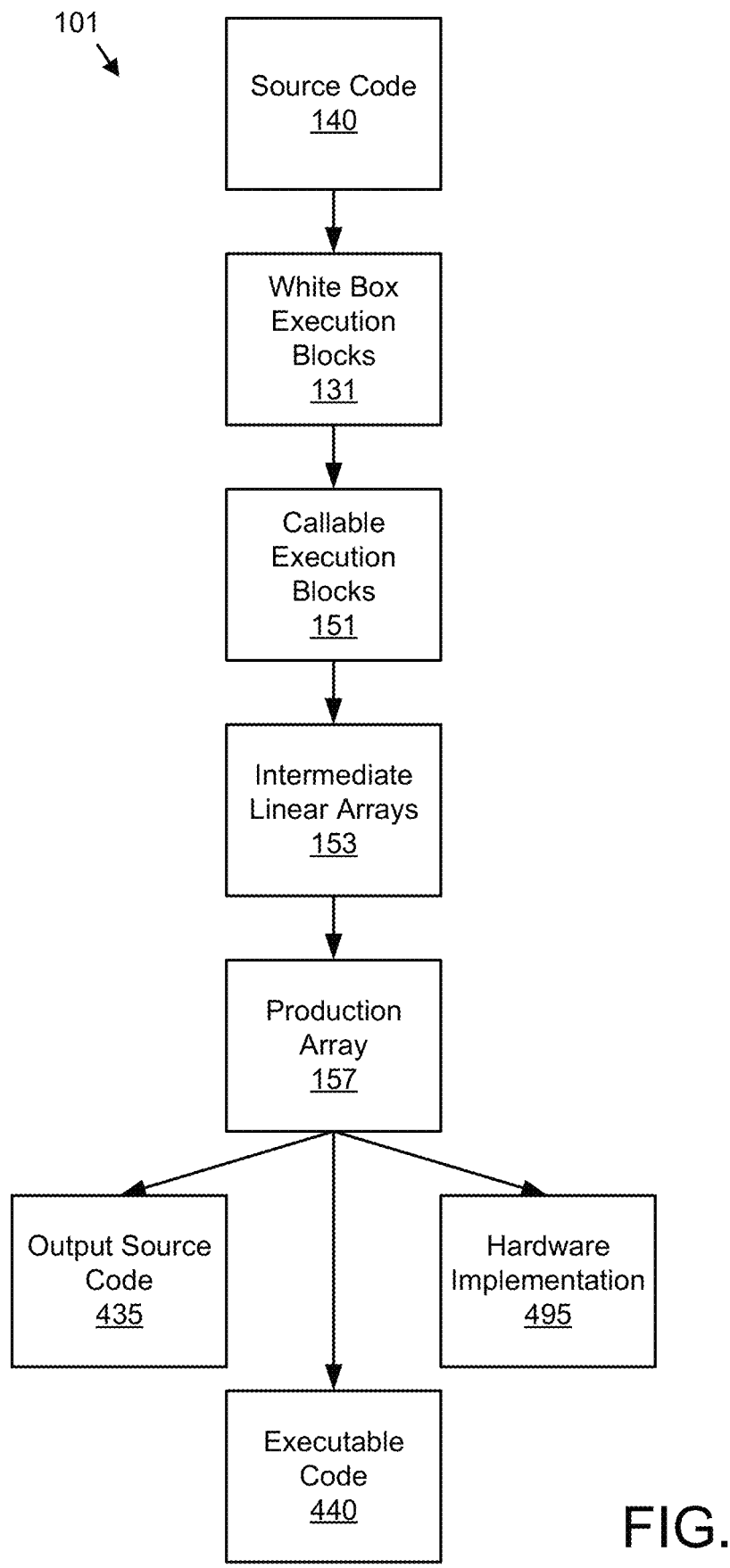
FIG. 1E is a schematic block diagram illustrating one embodiment of a production array implementation process.

FIG. 1E is a schematic block diagram illustrating one embodiment of a production array implementation process 101. The process 101 may identify a plurality of white box execution blocks 131 in the source code 140. The white box execution block 131 is described in more detail in FIG. 2P.

The process 101 may generate a callable execution block 151 for each white box execution block 131. The callable execution block 151 is described in more detail in FIG. 2L.

In addition, the process 101 may generate one or more intermediate linear arrays 153 from the callable execution blocks 151. The intermediate linear array 153 is described in FIG. 2M. The process 101 may further generate a production array 157 from the intermediate linear arrays 153. In one embodiment, the production array 157 is a minimized production array 157. The production array 157 is described in FIG. 2Q.

The production array 157 may be implemented as a hardware implementation 495 such as semiconductor gates 445. In addition, the production array 157 may be implemented as minimized hardware output source code 435. The production array 157 may further be implemented as minimized software output source code 435. In one embodiment, the production array 157 is implemented as executable code 440.

Figure 2A:
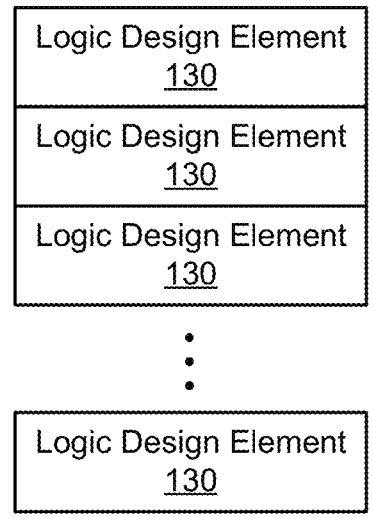
FIG. 2A is a schematic block diagram illustrating one embodiment of a logic design.

FIG. 2A is a schematic block diagram illustrating one embodiment of a source code 140. The source code 140 may be organized as a data structure in a memory. The source code 140 includes a plurality of logic design elements 130. Each logic design element 130 may include one or more logic elements 176 and/or one or more logic element relationships.

The source code 140 may be organized as a flat file comprising source code, Boolean descriptions, logical relationships, state relationships, and the like. Each logic design element 130 may be a line or other logical division of the file. Alternatively, the logic design elements 130 may define states 160, conditional logic 172, actions 174, or combinations thereof.

Figure 2B:
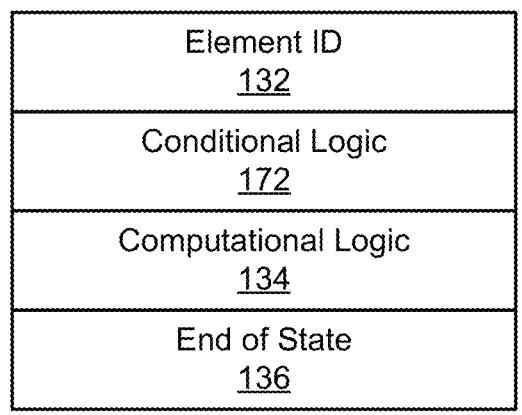
FIG. 2B is a schematic block diagram illustrating one embodiment of a logic design element.

FIG. 2B is a schematic block diagram illustrating one embodiment of a logic design element 130. The logic design element 130 may be organized as a data structure in a memory. Each logic design element 130 may be parsed from the source code 140. In the depicted embodiment, the logic design element 130 includes an input identifier 132, conditional logic 172, computational logic 134, and an end of state 136.

The element identifier 132 may uniquely identify the logic design element 130. The element identifier 132 includes a file name. In addition, the element identifier 132 may comprise a range of line numbers for a text file, a data structure reference number, or combinations thereof.

The conditional logic 172 may define conditions that must be satisfied in order to execute the computational logic 134. In addition, the conditional logic 172 may define an element identifier 132 if the conditions are not satisfied in order to execute the computational logic 134. In one embodiment, the conditional logic 172 is always performed if another logic design element 130 branches to the current element identifier 132. In one embodiment, the conditional logic 172 includes one or more of nodes 178, paths 182, logic gates 142, binary outputs 179, binary inputs 177, states 160, and actions 174.

The computational logic 134 may specify actions 174 that are performed if the conditional logic 172 is satisfied. The actions 174 may include one or more computational statements. Alternatively, the actions 174 may include one or more of nodes 178, paths 182, logic gates 142, binary outputs 179, binary inputs 177, and states 160. In addition, the computational logic 134 may assert and/or deassert one or more binary output variables and/or one or more next state values. The end of state 136 may indicate an end of the conditional logic 172 and the computational logic 134 associated with the element identifier 132.

Figure 2C:
FIG. 2C is a schematic block diagram illustrating one embodiment of a logic transformation.

FIG. 2C is a schematic block diagram illustrating one embodiment of a logic transformation 150. The logic transformation 150 may be generated from the logic design element 130. The logic transformation 150 may be organized as a data structure in a memory. In the depicted embodiment, the logic transformation 150 includes a logic transformation identifier 155, binary output variables 225, next state values 230, and input data 160.

The binary output variables 225 may be control signals such as binary outputs 179. In addition, the binary output variables 225 may identify data structures such as numerical values, alphanumeric values, logical values, dates, times, and the like. In one embodiment, the logic design element 130 is parsed to identify each binary output variable 225 from the computational logic 134.

The next state values 230 may define logical states. In one embodiment, the next state values 230 comprise an element identifier 132 for a logic design element 130. In addition, the next state values 230 may include one or more binary state values as will be described hereafter.

The input data 160 may define inputs that generate the binary output variables 225 and the next state values 230. In one embodiment, input data 160 is generated for each binary output variable 225 and each next state value 230.

Figure 2D:
FIG. 2D is a schematic block diagram illustrating one embodiment of input data.

FIG. 2D is a schematic block diagram illustrating one embodiment of input data 160. The input data 160 may be organized as a data structure in a memory. In the depicted embodiment, the input data 160 includes an input identifier 165 and a plurality of binary input variables 215.

The input identifier 165 may uniquely identify the input data 160. The binary input variables 215 may be control signals such as binary inputs 177. Alternatively, the binary input variables 215 may identify data structures such as numerical values, alphanumeric values, logical values, dates, times, and the like.

Figure 2E:
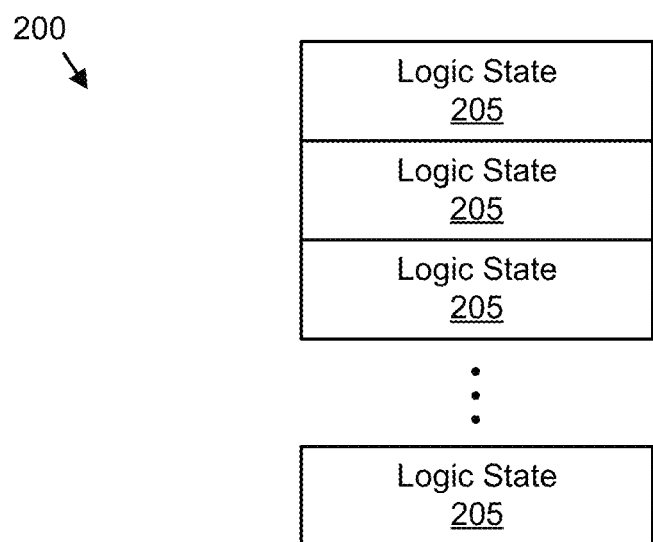
FIG. 2E is a schematic block diagram illustrating one embodiment of a linear array.

FIG. 2E is a schematic block diagram illustrating one embodiment of a linear array 200. The linear array 200 may be generated from the logic transformation 150. The linear array 200 may be organized as a data structure in a memory. The linear array 200 includes a plurality of logic states 205.

Figure 2F:
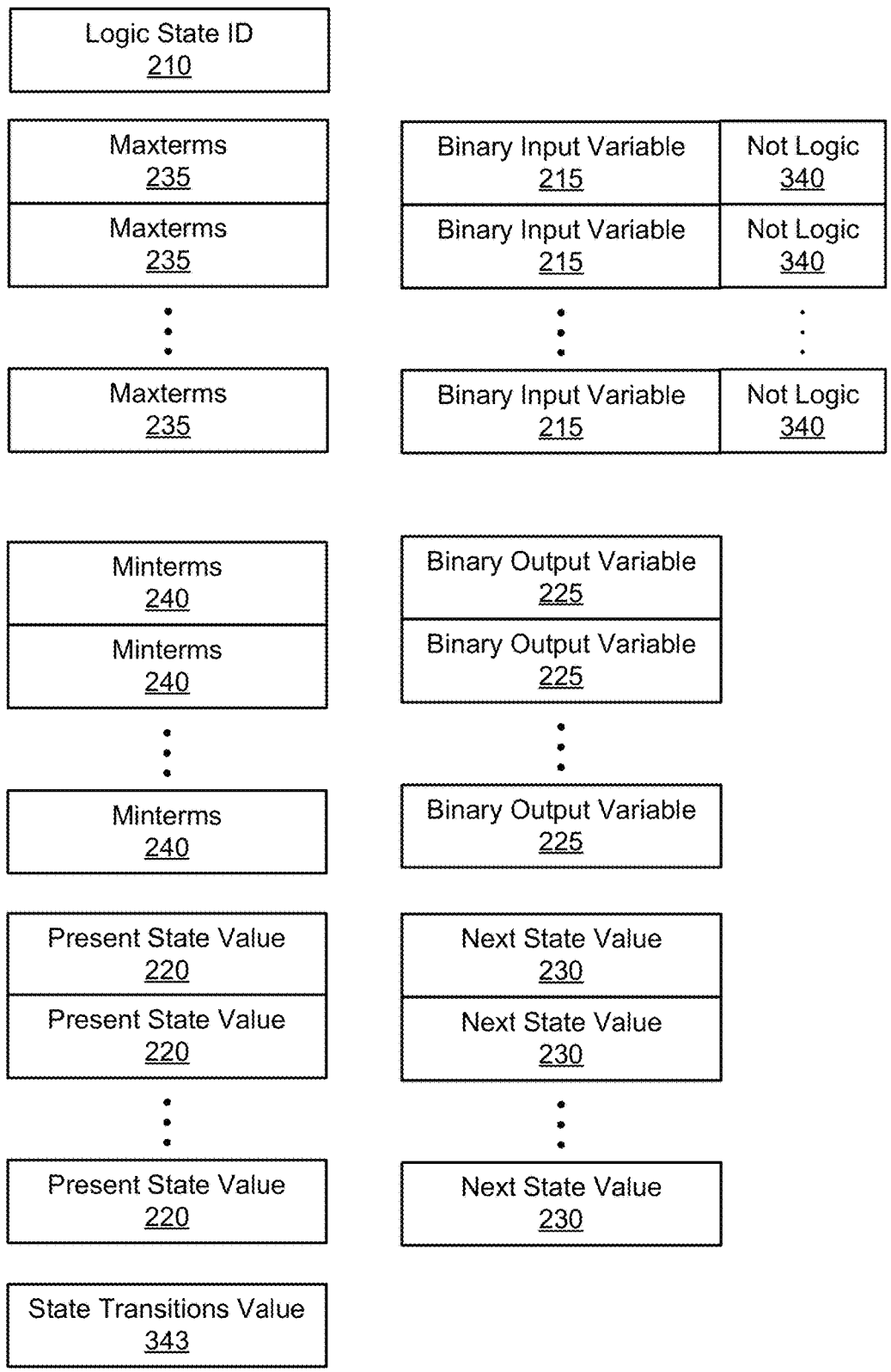
FIG. 2F is a schematic block diagram illustrating one embodiment of a logic state.

FIG. 2F is a schematic block diagram illustrating one embodiment of a logic state 205. The logic state 205 may be organized as a data structure in a memory. The logic state 205 includes a logic state identifier 210, one or more binary input variables 215, one or more binary output variables 225, one or more next state values 230, one or more present state values 220, one or more maxterms 235, one or more minterms 240, and a state transitions value 343.

The logic state identifier 210 may uniquely identify the logic state 205. The logic state identifier 210 may include a label, a mnemonic, or the like. In addition, the logic state identifier 210 may include a corresponding logic transformation identifier 155 for the logic transformation 150 that corresponds to the logic state 205.

The binary output variables 225 may include each binary output variable 225 from the source code 140. Alternatively, the binary output variables 225 may include each binary output variable 225 identified for the corresponding logic transformation 150. In one embodiment, each binary output variable 225 is assigned an identifier such as a label, a logical representation, an index value, or the like.

The binary input variables 215 may include each binary input variable 215 from the source code 140. In addition, the binary input variables 215 may include each binary input variable 215 identified for the corresponding logic transformation 150. NOT logic 340 may be associated with each binary input variable 215. The NOT logic 340 indicates whether an inverse of the binary input variable 215 is asserted. In one embodiment, each binary input variable 215 is assigned an identifier such as a label, a logical representation, an index value, or the like.

The present state values 220 may be binary values that uniquely define the logic state 205 as a binary value. The present state values 220 may uniquely describe the logic state identifier 210. The present state values 220 for each logic state 205 may be associated with a logic transformation identifier 155. In one embodiment, the present state values 220 may be selected reduce the complexity of the source code 140. In one embodiment, each present state value 220 is assigned an identifier such as a label, a logical representation, an index value, or the like.

The next state values 230 may define one or more next states that are branched to as a function of the binary input variables 215. The next state values 230 may be a binary encoding of the next state values 230 of the logic transformation 150. In one embodiment, each next state value 230 is assigned an identifier such as a label, a logical representation, an index value, or the like.

Each minterm 240 may be a binary product or logical AND of one or more binary input variables 215 and/or one or more present state values 220. Alternatively, each minterm 240 may be a binary product of one or more maxterms 235. In one embodiment, each minterm 240 is assigned an identifier such as a label, a logical representation, an index value, or the like.

Each maxterm 235 may be a binary sum or logical OR of one or more minterms 240. Alternatively, each maxterm 235 may be a binary sum of one or more binary input variables 215 and/or one or more present state values 220. In one embodiment, each maxterm 235 is assigned an identifier such as a label, a logical representation, an index value, or the like.

The state transitions value 343 may record a number of state transitions that have been traversed from a current logic state 205 to subsequent logic states 205. A state transition transitions active control from the current logic state 205 to a subsequent logic state 205. For example, the current logic state 205 STATE00 may transition active control of a device or computer to subsequent state 205 STATE01.

In one embodiment, the state transitions value 343 is incremented each time a state transition from the current logic state 205 is traversed. Alternatively, the state transitions value 343 records a total number of state transitions from the current logic state 205 to subsequent logic states 205.

The plurality of logic states 205 in the linear array 200 represents the multidimensional array of the source code 140 in a form that is more easily manipulated and analyzed. As a result, logic element relationships may be identified, analyzed, and resolved as will be described hereafter.

Figure 2G:
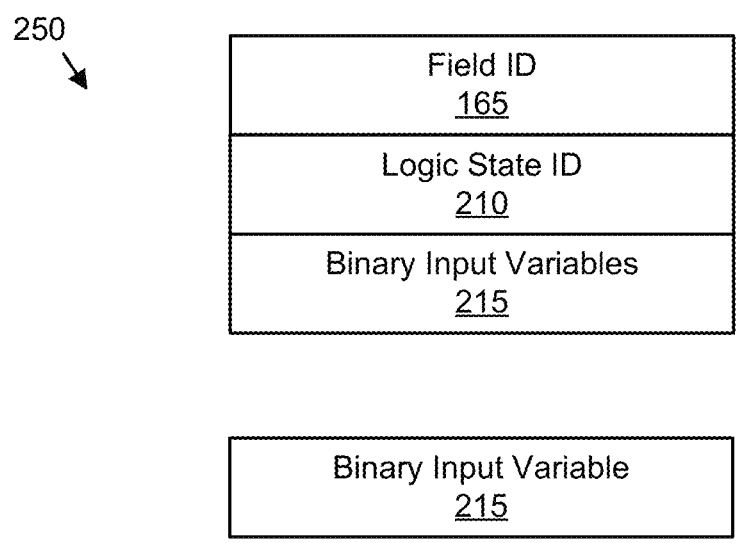
FIG. 2G is a schematic block diagram illustrating one embodiment of field data.

FIG. 2G is a schematic block diagram illustrating one embodiment of field data 250. The field data 250 describes a field in the combination map. The field data 250 may be organized as a data structure in a memory. In the depicted embodiment, the field data 250 includes a field identifier 165, one or more logic state identifiers 210, and one or more binary input variables 215.

The field identifier 165 may uniquely identify the field in the combination map. The logic state identifier 210 may identify a logic state 205 associated with the field. Each field may represent at least one single logic state 205. The binary input variables 215 may indicate which of the binary input variables 215 for the logic state 205 is associated with the field.

Figure 2H:
FIG. 2H is a schematic block diagram illustrating one embodiment of assertion indicator data.

FIG. 2H is a schematic block diagram illustrating one embodiment of assertion indicator data 170. The assertion indicator data 170 may indicate whether a logic element 176 is asserted. The assertion indicator data 170 may be organized as a data structure in a memory. In the depicted embodiment, the assertion indicator data 170 includes a logic element identifier 450, an assertion indicator 295, and an assertion value 290.

The logic element identifier 450 associates the assertion indicator data 170 with a logic element 176. The assertion value 290 specifies whether binary input variables 215, present state values 220, minterms 240, maxterms 235, binary output variables 225, next state values 230, state values 315 and other logic elements 176 are asserted, deasserted, a DON'T CARE, undefined, or unknown.

In one embodiment, the assertion indicator 295 is of an indicator type selected from the group consisting of a color, a label, an arrow, an icon, hashing, and motion. For example, the indicator type may be a color with blue indicating that a field is asserted and read indicating that the field is deasserted.

Figure 2I:
FIG. 2I is a schematic block diagram illustrating one embodiment of connection data.

FIG. 2I is a schematic block diagram illustrating one embodiment of relationship arrow data 175. The relationship arrow data 175 may define a relationship arrow between fields of the combination map as will be described hereafter. The relationship arrow data 175 may be organized as a data structure in a memory. In the depicted embodiment, the relationship arrow data 175 includes a connection identifier 255, a source field 260, a destination field 265, and the assertion indicator data 170.

The connection identifier 255 uniquely identifies a connection between the source field 260 and the destination field 265. The connection identifier 255 may be a label, an index, or the like.

The source field 260 may identify a first field that defines a first logical element relationship. The destination field 265 may identify one or more second fields that have second logical element relationships that include the first logical element relationship. For example, the source field 260 may define first binary input variables 215 that are included the minterms 240 of the destination field 265. The destination field 265 may be a combination map. The assertion indicator data 170 may indicate if the source field 260 and/or the connection between the source field 260 and the destination field 265 are asserted.

Figure 2J:
FIG. 2J is a schematic block diagram illustrating one embodiment of logic element data.

FIG. 2J is a schematic block diagram illustrating one embodiment of logic element data 185 for a logic element 176. The logic element data 185 may be organized as a data structure in memory. In the depicted embodiment, the logic element data 185 includes a logic element identifier 450, a logic element type 455, one or more input identifiers 456, one or more output identifiers 457, a partition identifier 459, an execution time 377, and a package identifier 461.

The logic element identifier 450 may uniquely identify the logic element. The logic element identifier 450 may be a label, an index, or the like.

The logic element type 455 may specify a type such as a binary input variable 215, a binary output variable 225, the minterm 240, a maxterm 235, a present state value 220, a next state value 230, not logic 340, a state transition between logic states 205, and the like. Alternatively, the logic element type 455 may specify a logic state 205, a state 160, a software variable, conditional logic 172, computational logic 134, an action 174, a node 178, a path 182, or the like.

The input identifiers 456 may list the logic element identifiers 450 of inputs such as binary inputs 177 to the logic element. The output identifiers 457 may list the logic element identifiers 450 of logic elements receiving outputs from the logic element.

The partition identifier 459 may specify a partition that the logic element is assigned to. A partition may be a device design, hardware design elements for a device, software design elements for a device, or the like. For example, the partition identifier 459 may specify the logic element 176 is assigned to a software design partition. Alternatively, the partition identifier 459 may specify that the logic element 176 is assigned to a hardware design partition.

The execution time 377 may specify one or more of a minimum time for a state transition, a maximum time for a state transition, an average time for a state transition, a mean time for a state transition, a medium time for a state transition, the simulation generated time for a state transition, or the like.

The package identifier 461 may specify a destination package for the logic element. The destination package may be a defined package or a computational package. The defined package and the computational package may be used to validate the linear array 200.

Figure 2K:
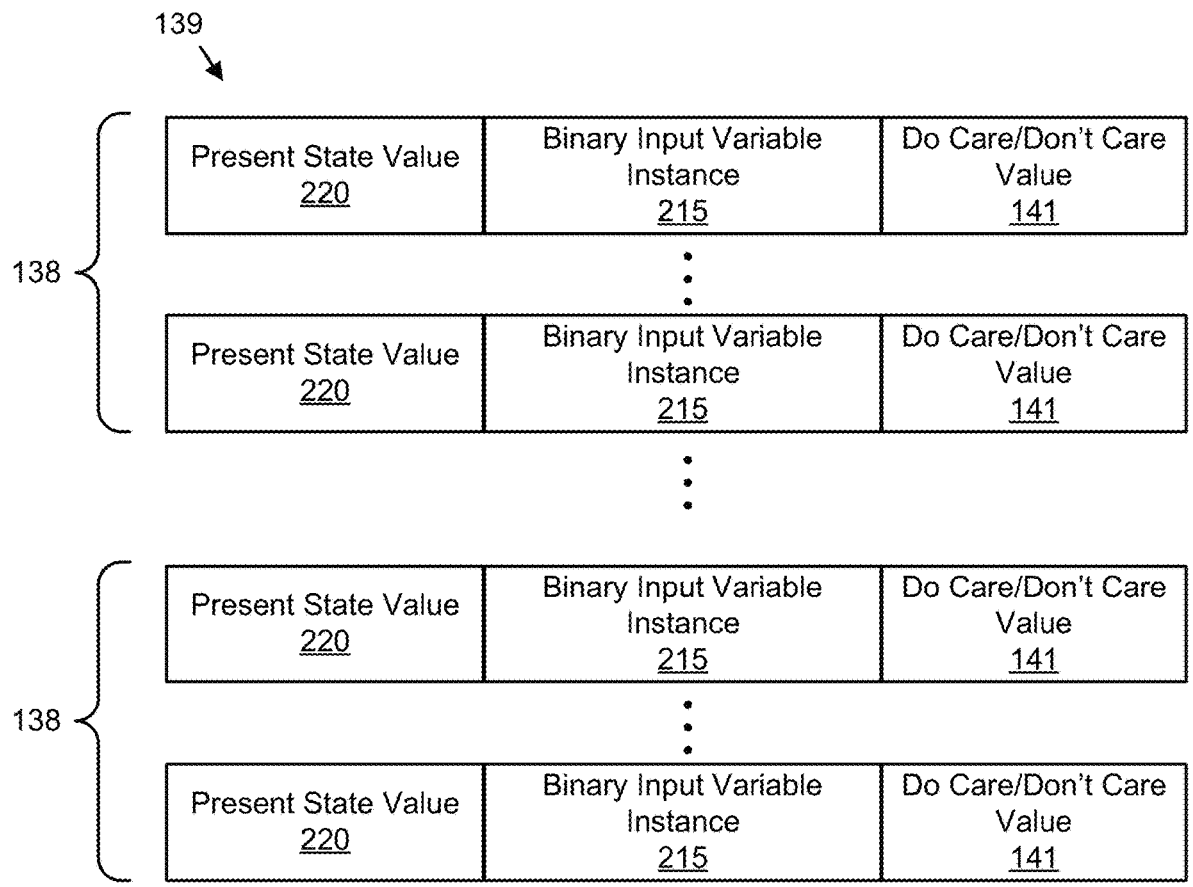
FIG. 2K is a schematic block diagram illustrating one embodiment of a do care array.

FIG. 2K is a schematic block diagram illustrating one embodiment of a do care array 139. The do care array 139 may be organized as a data structure in a memory. The do care array 139 may include a plurality of dimensions 138. The do care array 139 may include a dimension 138 for all present state values 220 and each binary input variable 215 of the callable execution block 131. In addition, the do care array 139 includes a binary do care/don't care value for each combination of present state values 220 and binary input variable instances 215 in a dimension 138.

FIG. 2L is a schematic block diagram illustrating one embodiment of a callable execution block 151. The callable execution block 151 may be organized as a data structure in a memory. In one embodiment, the callable execution block 151 includes the logic transformation identifier 155, the binary output variables 225, the next state values 230, and the input data 160 of the logic transformation 150 of FIG. 2C. In addition, the callable execution block 151 may include the do care array 139, state variables 133, the present state values 220, callable source code parameters 137, and the binary input variables 215. The state variables 133 are described in more detail in FIG. 2O.

The callable source code parameters 137 may associate one or more of the present state values 220 and the binary input variables 215 with a callable mnemonic. The callable mnemonic may be employed to define the present state values 220 and/or the binary input variables 215. The callable source code parameters 137 may be globally maintained.

FIG. 2M is a schematic block diagram illustrating one embodiment of an intermediate linear array 153. The intermediate linear array 153 may be organized as a data structure in a memory. In one embodiment, an intermediate linear array 153 is generated for each callable execution block 151. In the depicted embodiment, the intermediate linear array 153 includes a plurality of entries 152. Each entry 152 includes a unique combination of the present state values 220 and the binary input variable instances 215 that are do cares as indicated by the do care/don't care value 141. The present state values 220 and the binary input variable instances 215 that are don't cares are excluded from the intermediate linear array 153.

FIG. 2N is a schematic block diagram illustrating one alternate embodiment of an intermediate linear array 153. In the depicted embodiment, each entry 152 includes the logic state 205 for the unique combination of the present state values 220 and the binary input variable instances 215 that are do cares as indicated by the do care/don't care value 141.

The logic states 205 that include present state values 220 and the binary input variable instances 215 that are don't cares are excluded from the intermediate linear array 153.

FIG. 2O is a schematic block diagram illustrating one embodiment of state variables 133. The state variables 133 may be organized as a data structure in a memory. In one embodiment, each state variable 133 is Boolean. For example, each state variable 133 may be a one or zero. Alternatively, each state variable 133 may be true or false. In one embodiment, each state variable 133 is asserted or deasserted. The state variables 133 may be associated with a corresponding white box execution block 131. Each state variable 133 may only be modified by the corresponding white box execution block 131 and may be modified at least once by the corresponding white box execution block 131. In addition, each state variable 113 persists from one execution of a white box execution block 131 to another execution of the white box execution block 131. The state variables 113 are modified as a function of the binary input variables 215 and the present state values 220.

Figure 2P:
FIG. 2P is a schematic block diagram illustrating one embodiment of a white box execution block.

FIG. 2P is a schematic block diagram illustrating one embodiment of the white box execution block 131. The white box execution block 131 may be organized as a data structure in a memory. In the depicted embodiment, the white box execution block 131 includes the element identifier 132, the conditional logic 172, the computational logic 134, and the end state 136 of the logic design element 130. In addition, the white box execution block 131 may include a begin block delimiter 344, an end block delimiter 346, one or more logically atomic code blocks 341, and the state variables 133.

The white box execution block 131 may be identified from the source code 140. Each white box execution block 131 may be delimited by the begin block delimiter 344 and the end block delimiter 346 in the source code 140.

In one embodiment, the conditional logic 172 is used to identify one or more logically atomic code blocks 341. Each logically atomic code block 341 may be a collection of SLOC 173 that is executed sequentially from a common logical condition 172. In addition, logically atomic code blocks 341 that modify the white box execution block 131 may be appended to the white box execution block 131. In one embodiment, each logically atomic code block 341 that begins within the white box execution block 131 also ends within the white box execution block 131.

FIG. 2Q is a schematic block diagram illustrating one embodiment of a production array 157. The production array 157 may be organized as a data structure in a memory. The production array 157 may comprise a plurality of entries 152 from one or more intermediate linear arrays 153. In one embodiment, the production array 157 is generated by minimizing and joining the one or more intermediate linear arrays 153.

Figure 3A:
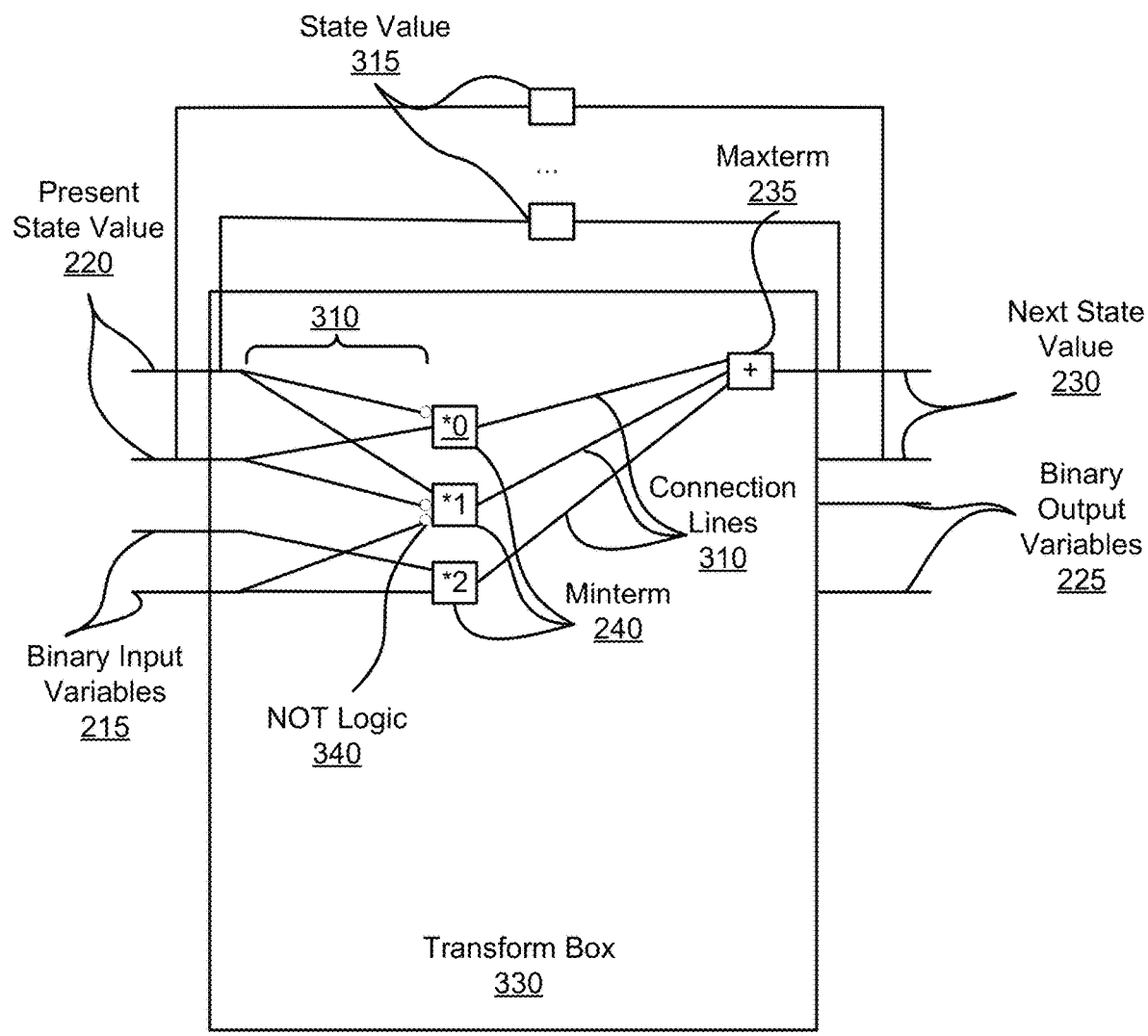
FIG. 3A is a schematic block diagram illustrating one embodiment of a transform box.

FIG. 3A is a schematic block diagram illustrating one embodiment of a transform box 330. The transform box 330 represents one or more logic states 205 as combinatorial logic. The transform box 330 allows undefined logic element relationships to be identified and resolved. Each transform box 330 may be associated with at least one logic state 205 and the field data 250 for the at least one logic state 205. The transform box 330 may be presented as a graphical user interface (GUI) on display. The elements of the transform box 330 may be manipulated by user. In the depicted embodiment, the elements of the transform box 330 include state values 315, the present state values 220, the next state values 230, the binary input variables 215, the NOT logic 340, one or more minterms 240, and one or more maxterms 235. In the depicted embodiment, the transform box 330 shows sum of products logic. Alternatively, the transform box 330 may display product of sums logic.

In one embodiment, only one maxterm 235 is displayed at a given time. Alternatively, each maxterm 235 for the logic state 205 may be displayed at a given time. Each maxterm 235 is represented as a logical sum of one or more minterms 240. Each maxterm 235 defines one or more of a next state value 230 and a binary output variable 225. Alternatively, only one minterm 240 may be displayed for product of sums logic.

Each minterm 240 may be displayed as a function of one or more binary input variables 215 and the NOT logic 340 associated with the binary input variables 215. In addition, each minterm 240 may be displayed as a function of the present state values 220.

The state values 315 may indicate previous next state values 230 that define the present state values 220. The next state values 230 define a next logic state 205. The binary output variables 225 define the actions 174 of the logic state 205.

Connection lines 310 may show the logical relationship of the binary input variables 215 and present state values 220 to minterms 240 and NOT logic 340. In addition, the connection lines 310 may show the logical relationship of the minterms 240 to the maxterms 235. Assertion indicator data 170 may define an assertion value for each connection line 310. A Boolean expression may be derived from the connection lines 310, binary input variables 215, present state values 220, NOT logic 340, minterms 240, and maxterms 235.

In one embodiment, a user may modify a logic state 205 by editing the displayed present state values 220, binary input variables 215, NOT logic 340, minterms 240, maxterms 235, next state values 230, binary output variables 225, and connection lines 310.

Figure 3B:
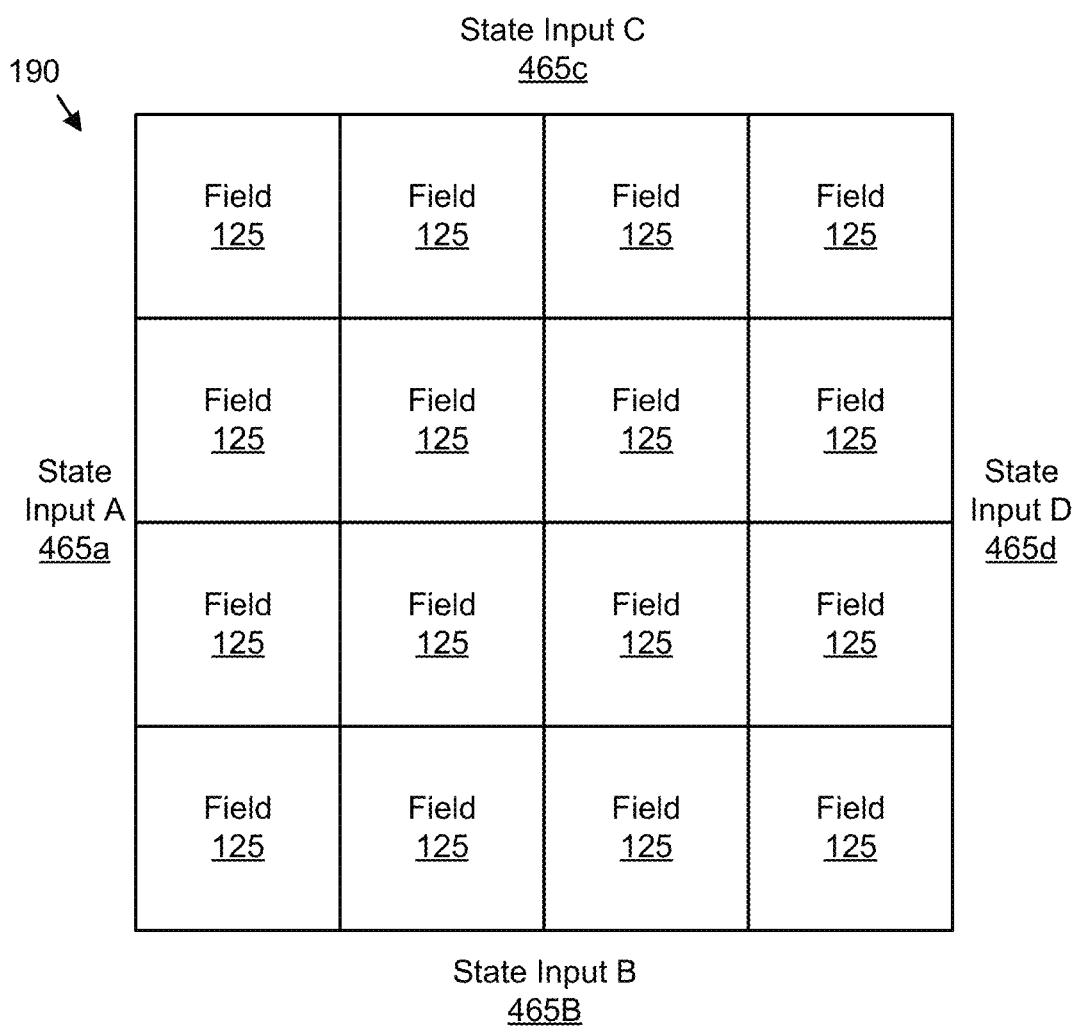
FIG. 3B is a drawing illustrating one embodiment of a combination map.

FIG. 3B is a drawing illustrating one embodiment of a combination map 190. In the depicted embodiment, fields 125 are shown for four state inputs 465. Each state input 465 is one of a binary input variable 215 and a present state value 220. Each field 125 is associated with unique field data 250. Each field 125 may represent a logic state 205. Alternatively, each field 125 may represent a plurality of binary input variables 215 as will be shown in FIG. 3D.

In one embodiment, state inputs 465 are automatically organized into the plurality of fields 125. For example, present state values 220 may be assigned to fields of higher level combination maps 190 while binary input variables 215 may be assigned to lower level combination maps 190. In addition, binary input variables 215 that defined in for a larger number of minterms 235 may be assigned to higher level combination maps 190. In one embodiment, binary input variables 215 that are defined with differing assertion values 290 for a larger number of minterms 235 are assigned to higher level combination maps 190.

Figure 3C:
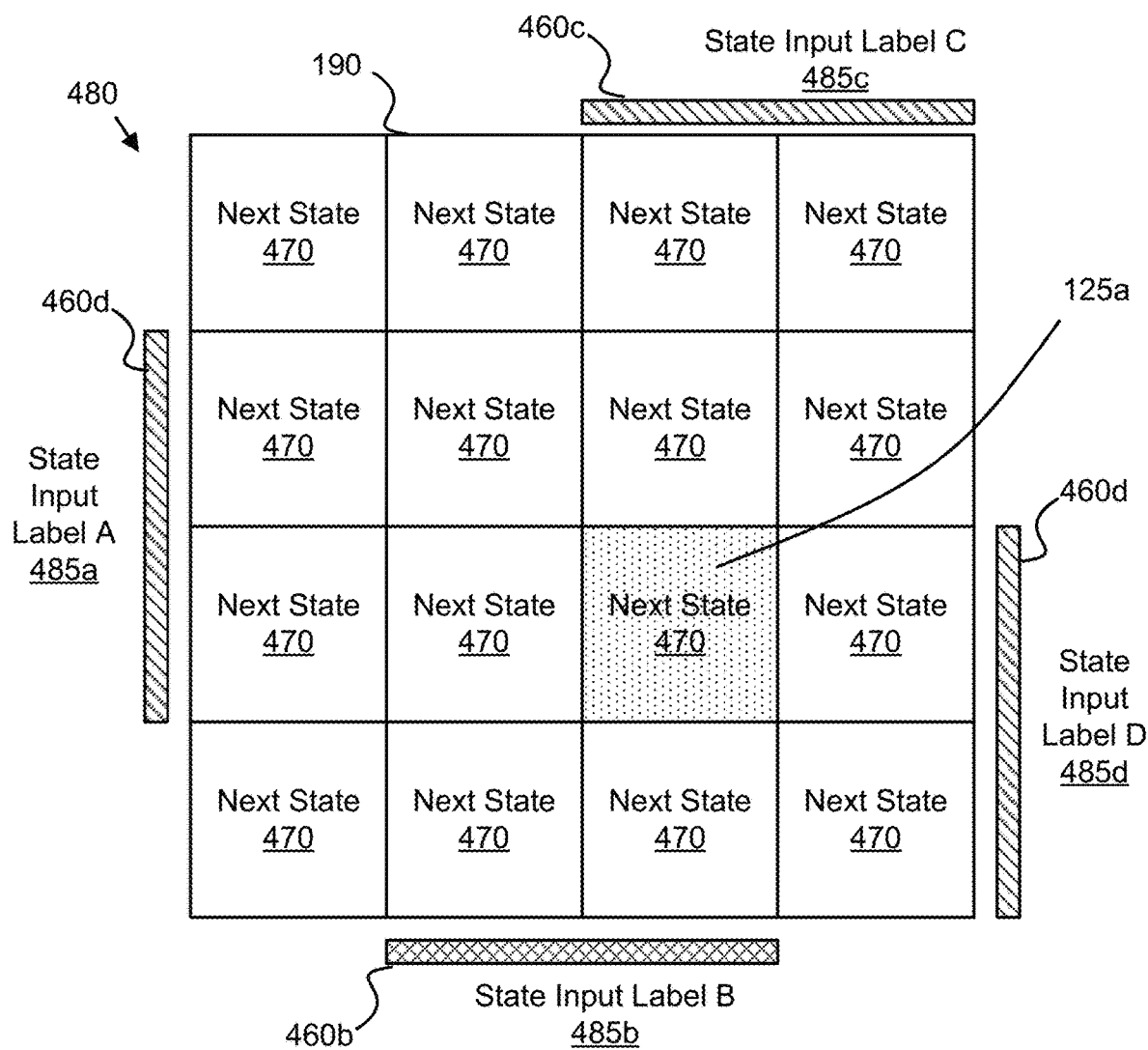
FIG. 3C is a drawing illustrating one embodiment of a combination map display.

FIG. 3C is a drawing illustrating one embodiment of a combination map display 480. A combination map 190 is displayed to the user such as on the display of a computer. State input labels 485 are shown for each state input 465 of FIG. 3B. Assertion bars 460 indicate whether each state input 465 is asserted or deasserted. Each field 125 of FIG. 3B displays a next state 470 if the state inputs 465 for the field 125 are asserted. The next state 470 may be next state values 230, a logic state identifier 210, or combinations thereof. Alternatively, the next state 470 may indicate another combination map 190 with binary input variables 215 that determine if the field 125 is asserted.

If the state inputs 465 indicated by the state input labels 485 are present state values 220, each field 125 may represent a logic state 205. A user may be prompted to enter a logic state identifier 210 for each logic state 205.

In addition, each field 125 may define an assertion value for the one or more binary output variables 225. The user may be prompted to define the assertion value 290 of a binary output variable 225 for each field 125 and/or each logic state 205.

In the depicted embodiment, a first field 125a is defined as asserted as a result of each the state inputs 465 identified by the state input labels 485 being asserted. As a result, upon completion of the logic state 205 defined by the present state values 220, the next state values 230 associated with the next state 470 will be asserted.

Figure 3D:
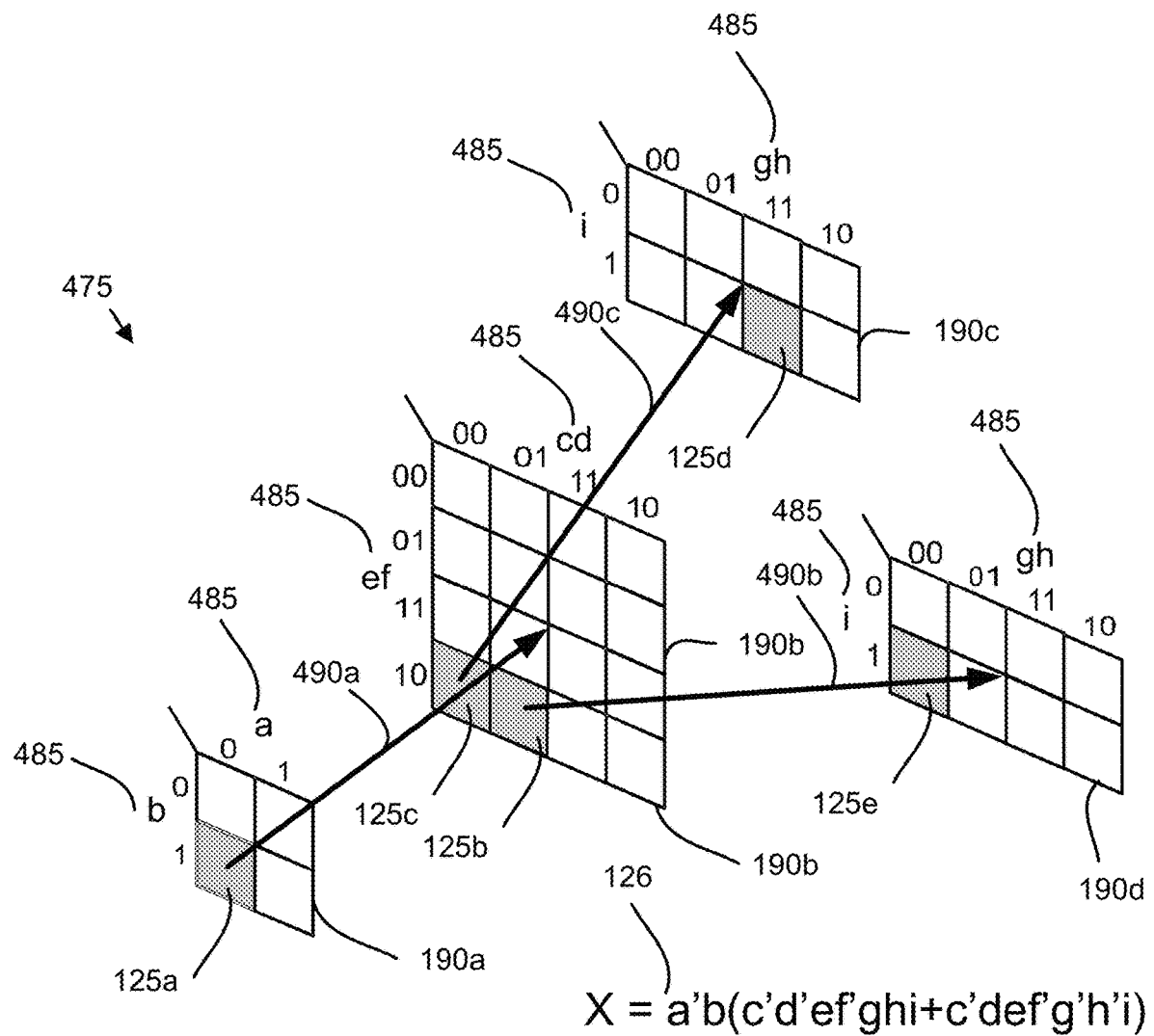
FIG. 3D is a drawing illustrating one embodiment of combination map levels.

FIG. 3D is a drawing illustrating one embodiment of combination map level display 475. A plurality of combination maps 190 are shown as though displayed on the display of the computer. Each field 125 may correspond to a logic state 205, one or more minterms 240, one or more maxterms 240, or combinations thereof.

In one embodiment, each combination map 190 on a lower level, such as combination maps 190b-d, corresponds to only one field 125 on a combination map 190 of an upper level, such as combination map 190a. The state input labels 485 may indicate the state inputs 465 such as present state values 220 and binary input variables 215 that define the fields 125. Assertion values 290 are also indicated for the state inputs 465.

In one embodiment, the fields 125 of the upper level combination maps 190 correspond to logic states 205. For example, each field 125 of the top-level combination map 190a may correspond to a logic state 205. Alternatively, the fields 125 of two or more upper level combination maps 190 may correspond to logic states 125. The state inputs 465 of the upper level combination maps 190 may be present state values 230 that indicate which logic state 205 is active.

A first field 125a of a first combination map 190a may be defined by a second combination map 190b as indicated by a first relationship arrow 490a. Each relationship arrow 490 may connect a field 125 of an upper level combination map 190 to a lower level combination map 190. The first combination map 190a may represent the present state values 220a and b.

The second combination map 190b may represent the Boolean equation cef'. A second relationship arrow 490b may indicate that a second field 125b of the second combination map 190b is defined by a fourth combination map 190d. The fourth combination map 190d may represent the Boolean equation g'h'i as indicated by asserting a fifth filed 125e. A third relationship arrow 490c may indicate that a third field 125c is defined by a third combination map 190c. The third combination map 190c may represent the Boolean equation ghi as indicated by asserting a fourth field 125d. In the depicted embodiment, the combination map level display 475 represents the Boolean equation 126

$$X = a'b(c'd'ef'ghi + c'def'g'h'i).$$

The plurality of combination maps 190 forms a multilevel display format. The multilevel display format has a top display level as illustrated by the first combination map 190a and at least one lower display levels as illustrated by the second and third combination maps 190b-c.

Each combination map 190 includes state input labels 485 that identify the state inputs 465 for the combination map 190. Relationship arrows 490 show the logical relationship between a combination map 190 and a field 125. The relationship arrows 490 may be defined by the relationship arrow data 175.

In one embodiment, relationship arrows 490 link a first field 125a with successive combination maps 190 at successive display levels. The relationship arrows 490 indicate a logical relationship between the fields 125.

A combination of first binary input variables 215 and/or present state values 220 for a first field 125a may be identified by selecting the first field 125a of a combination map 190a at first display level. In response to selecting the first field 125a, additional combinations of second binary input variables 215 in a successive combination map 190 that logically define the first field 125a may be identified. The combination map 190 of the second binary input variables 215 may be at a successive display level lower than the first display level.

In one embodiment, combination maps 190 of additional binary input variables 215 that logically define the selected first field 125a are displayed on combination maps 190 at each successive level until the last display level is reached. In one embodiment, the combination maps 190 may be logically collapsed. A binary output variable 225 may be assigned to the combination of all binary input variables 215 on each display level of the combination maps 190 for the selected first field 125a. In addition, the combination of all binary input variables 215 on each display level of the combination maps 190 may be converted into a logical expression 126.

FIG. 3E is a text illustration showing one embodiment of source code 342 with delimiters. The exemplary source code 342 of FIG. 1C is shown after being parsed by the parsing module 104. The source code 342 includes logically atomic code blocks 341. Delimiters including begin block delimiters 344, end block delimiters 346, and destination delimiters 348 are inserted.

A begin block delimiter 344 may be inserted to mark the beginning of a logic design element 130. A logic design element 130 may include a logically atomic block of code between conditional logic 172, with no conditional logic 172 between the conditional logic 172. The conditional logic 172 is depicted as a conditional statement. In one embodiment, a begin block delimiter 344 is inserted before each conditional logic conditional statement.

The begin block delimiter 344 may include a block identifier such as a label, an alphanumeric stream, and/or an index. In the depicted embodiment, letters identify each logic design element.

An end block delimiter 346 may be inserted to mark the end of a logic design element 130. Each end block delimiter 346 may include a block identifier. In the depicted embodiment, letters identify each logic design element.

A destination delimiter 348 indicates a logic design element 130 that becomes active in response to conditional logic 172 being one of satisfied or not satisfied. In the depicted embodiment, the destination delimiter 348 indicates a destination if the conditional logic 172 is satisfied. In one embodiment, a next logic design element 130 in the source code 342 becomes active if the conditional logic 172 of the logic design element is not satisfied.

Figure 3F:
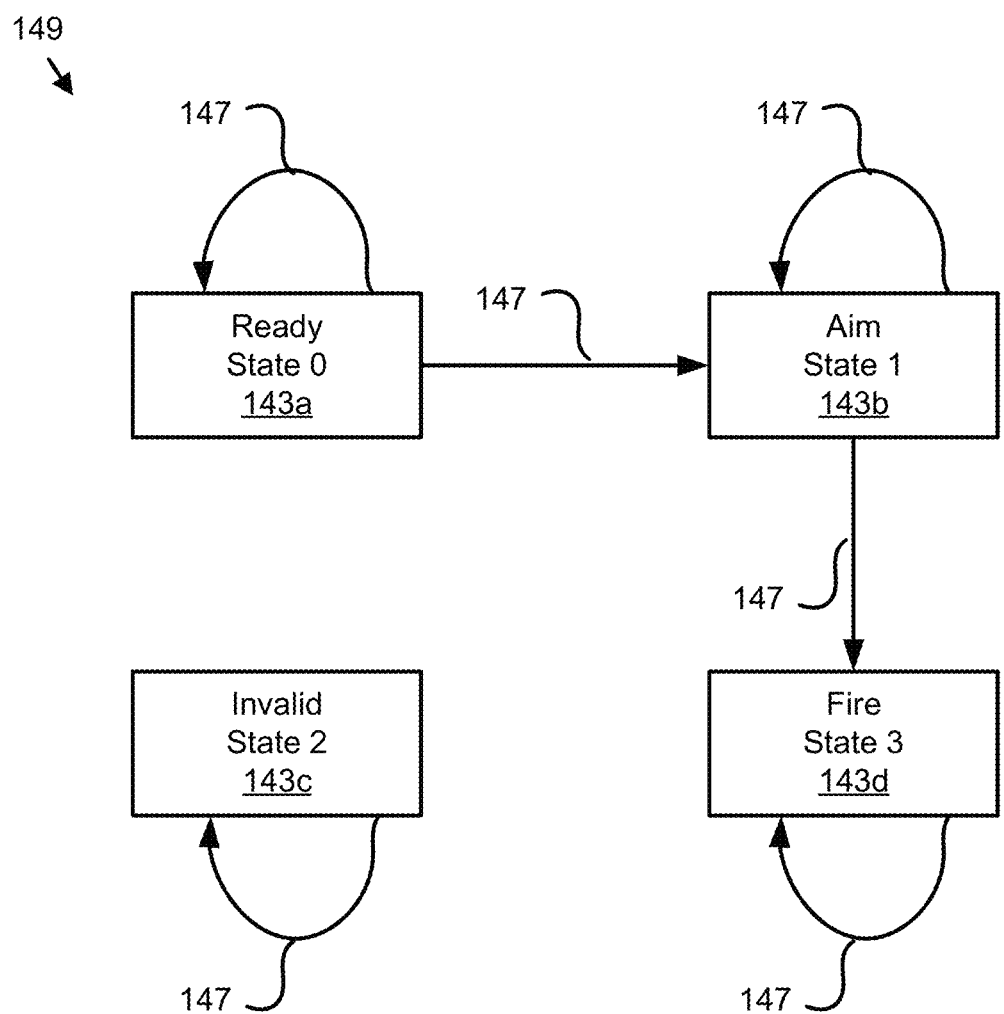
FIG. 3F is a schematic drawing illustrating one embodiment of a finite state machine diagram.

FIG. 3F is a schematic drawing illustrating one embodiment of a finite state machine diagram 149. In the depicted embodiment, the finite state machine diagram 149 is generated for exemplary source code 140. The finite state machine diagram 149 includes a plurality of states 143. State transitions 147 between the states 143 are based on the present state values 220 and the binary input variables 215 for the state 143.

Figure 3G:
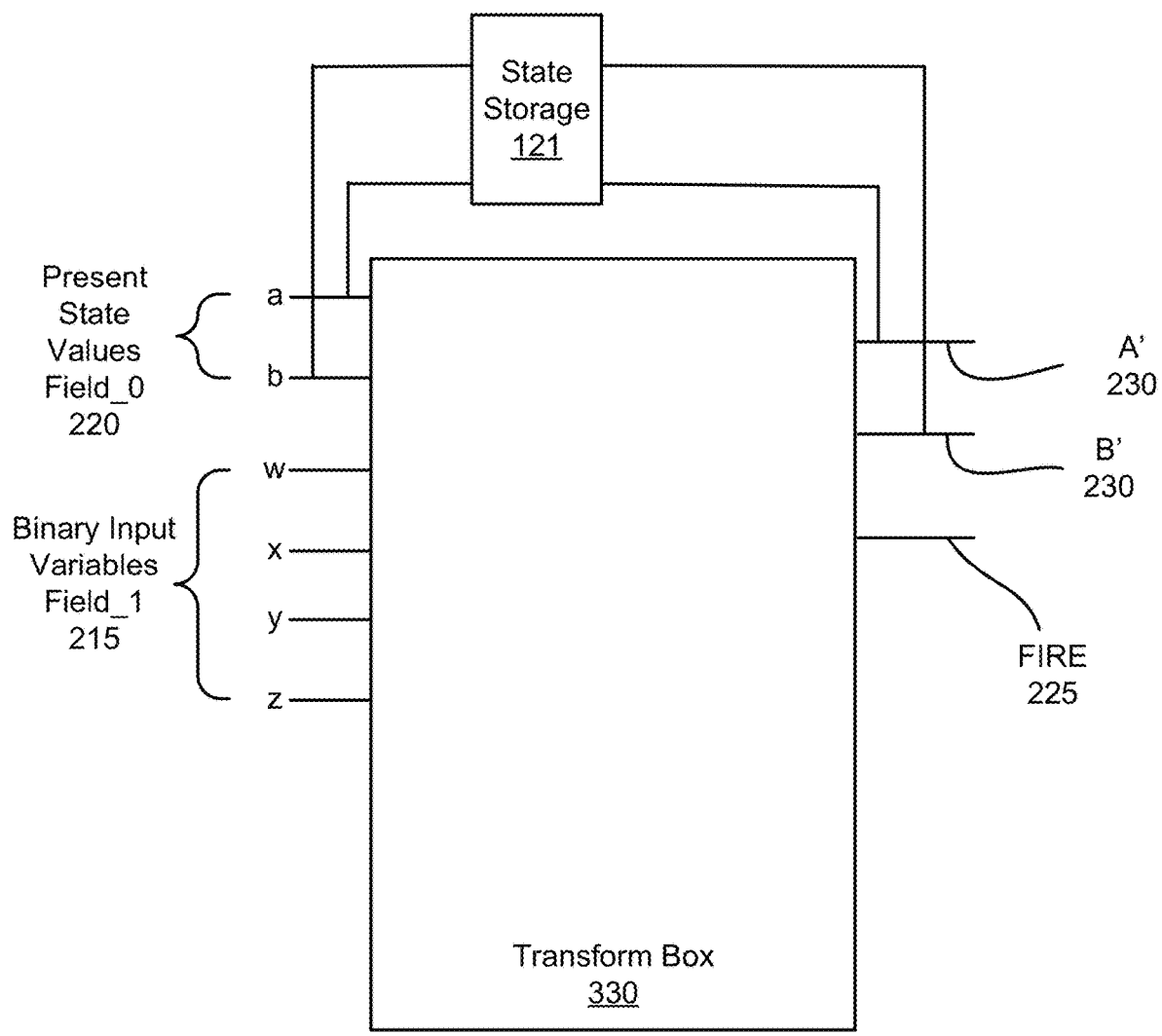
FIG. 3G is a schematic drawing illustrating one alternate embodiment of a transform box.

FIG. 3G is a schematic drawing illustrating one alternate embodiment of a transform box 330. The transform box 330 implements the exemplary source code 140 of FIG. 3F. The present state values 220 are stored in the states storage 221 and represented hereafter as Field_0. The binary input variables 215 are represented as Field_1. The transform box 330 generates next state values 230 that are stored in the states storage 121 and an exemplary binary output variable "FIRE" 225.

Figure 3H:
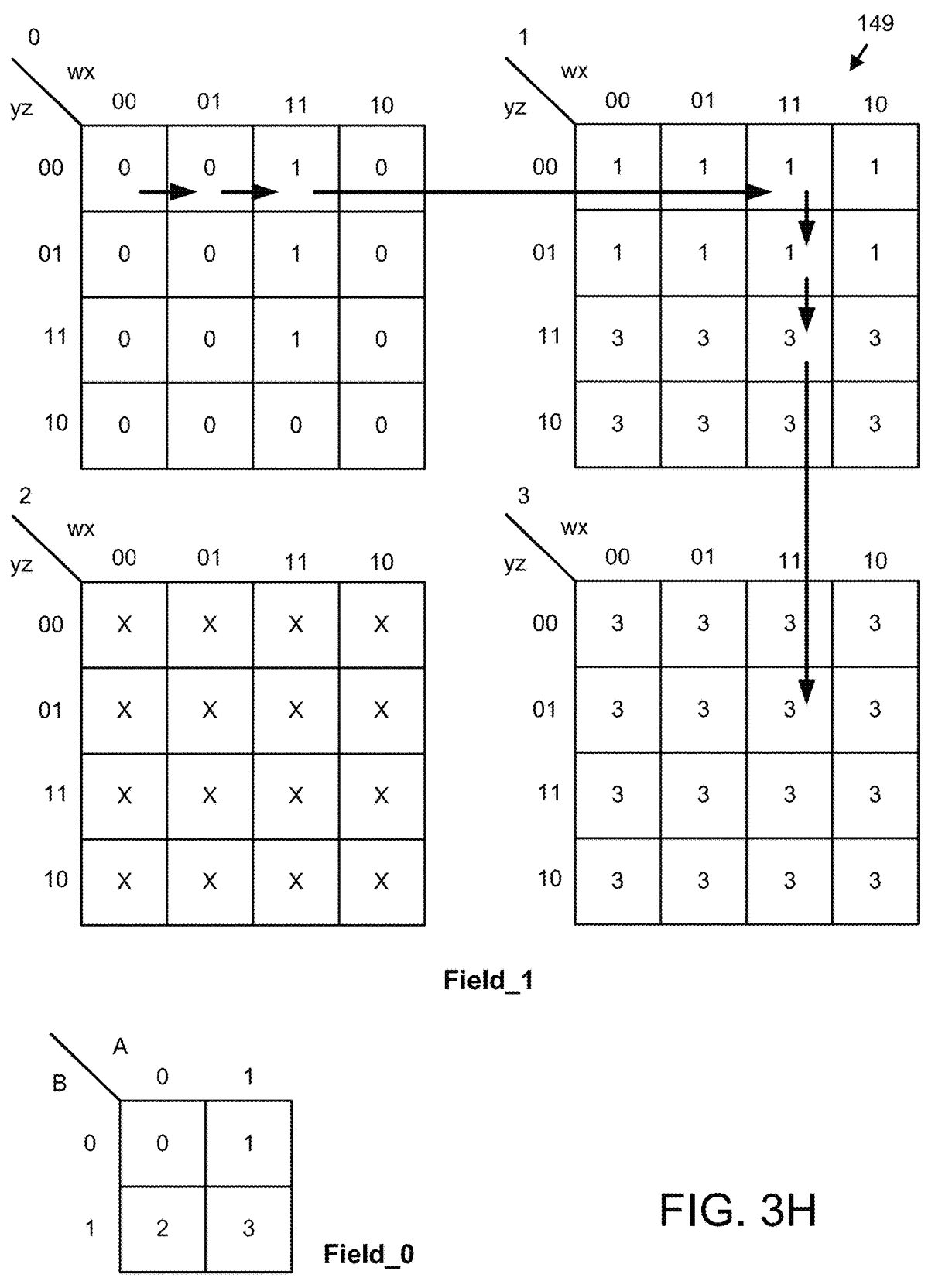

FIG. 3H is a drawing illustrating one embodiment of generating an intermediate linear array 153 from a combination map 190. Combination maps 190 for present state values Field_0 220 and binary input variables Field_1 215 of FIG. 3G are shown.

Figure 3I:
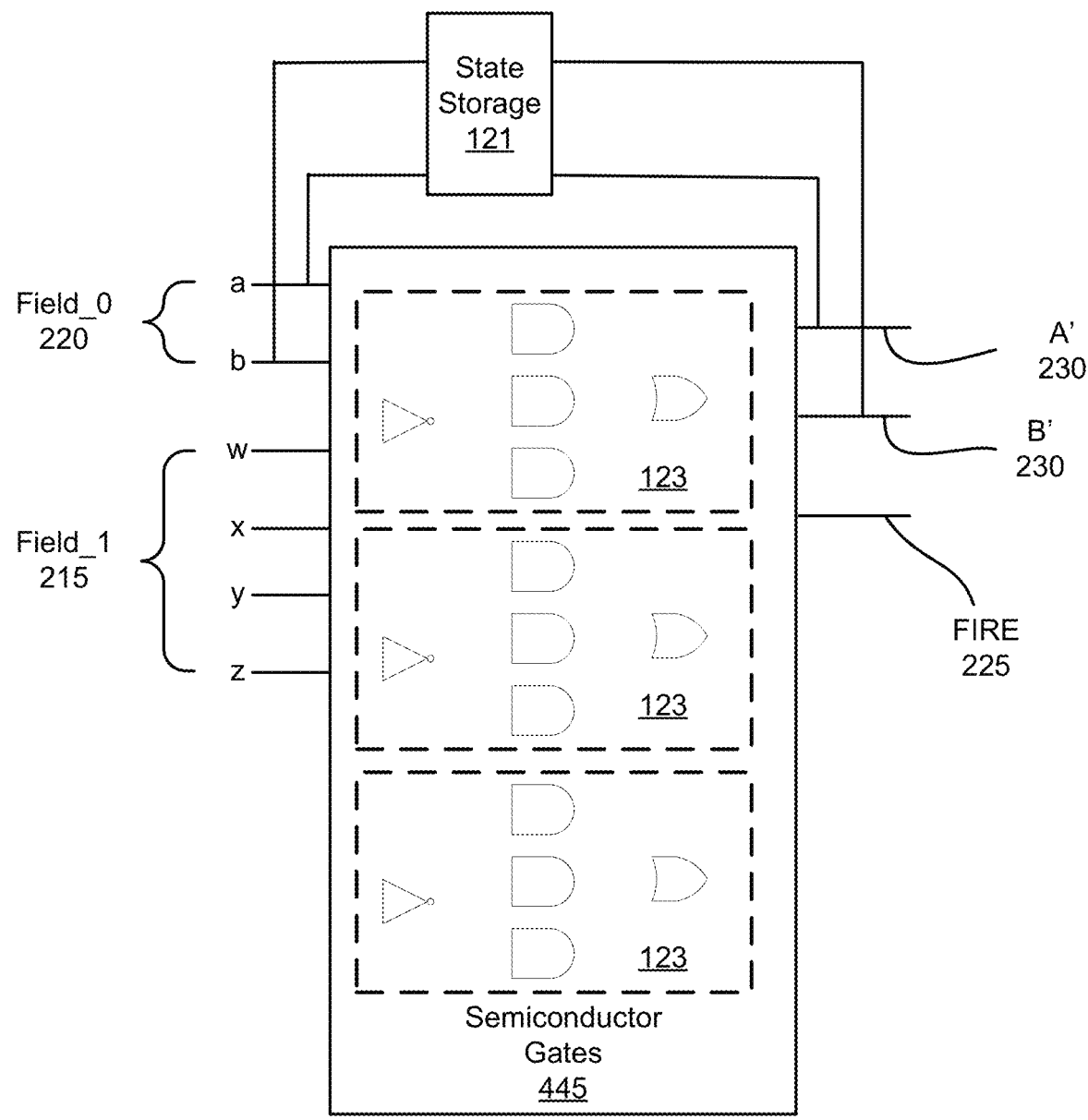
FIG. 3I is a schematic drawing illustrating one embodiment of semiconductor gates.

FIG. 3I is a schematic drawing illustrating one embodiment of semiconductor gates 445. In the depicted embodiment, a production array 157 generated from the intermediate linear array 153 of FIG. 3H is implemented in the semiconductor gates 445. In one embodiment, the production array 157 is generated using a plurality of standard cells 123. Each standard cell 123 may have at most three gate delays.

Figure 4A:
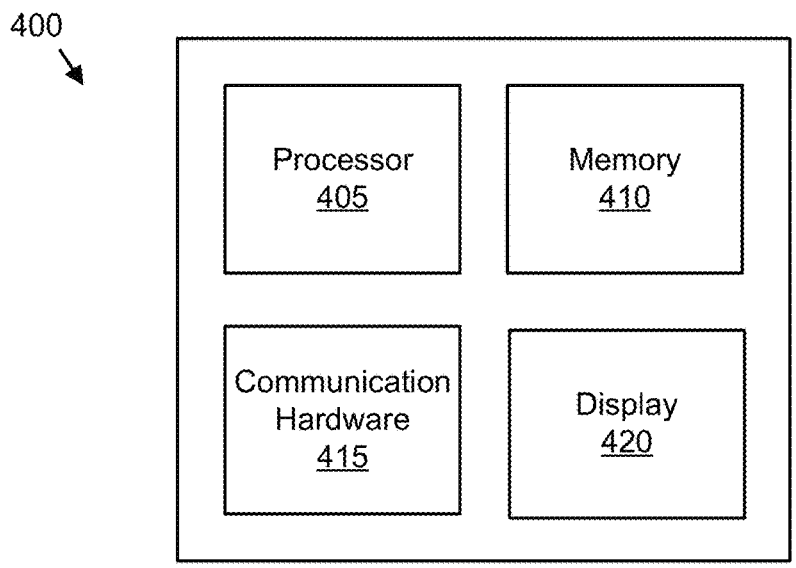
FIG. 4A is a schematic block diagram illustrating one embodiment of a computer.

FIG. 4A is a schematic block diagram illustrating one embodiment of a computer 400. The encoding module 104 and the parsing module 105 may be embodied in the computer 400. In the depicted embodiment, the computer 400 includes a processor 405, a memory 410, communication hardware 415, and a display 420. The memory 410 may be a semiconductor storage device, a hard disk drive, an optical storage device, a micromechanical storage device, or combinations thereof. The memory 410 may store code. The processor 405 may execute the code. The communication hardware 415 may communicate with other devices. In addition, the communication hardware 415 may receive inputs from a user. The display 420 may communicate data to the user.

Figure 4B:
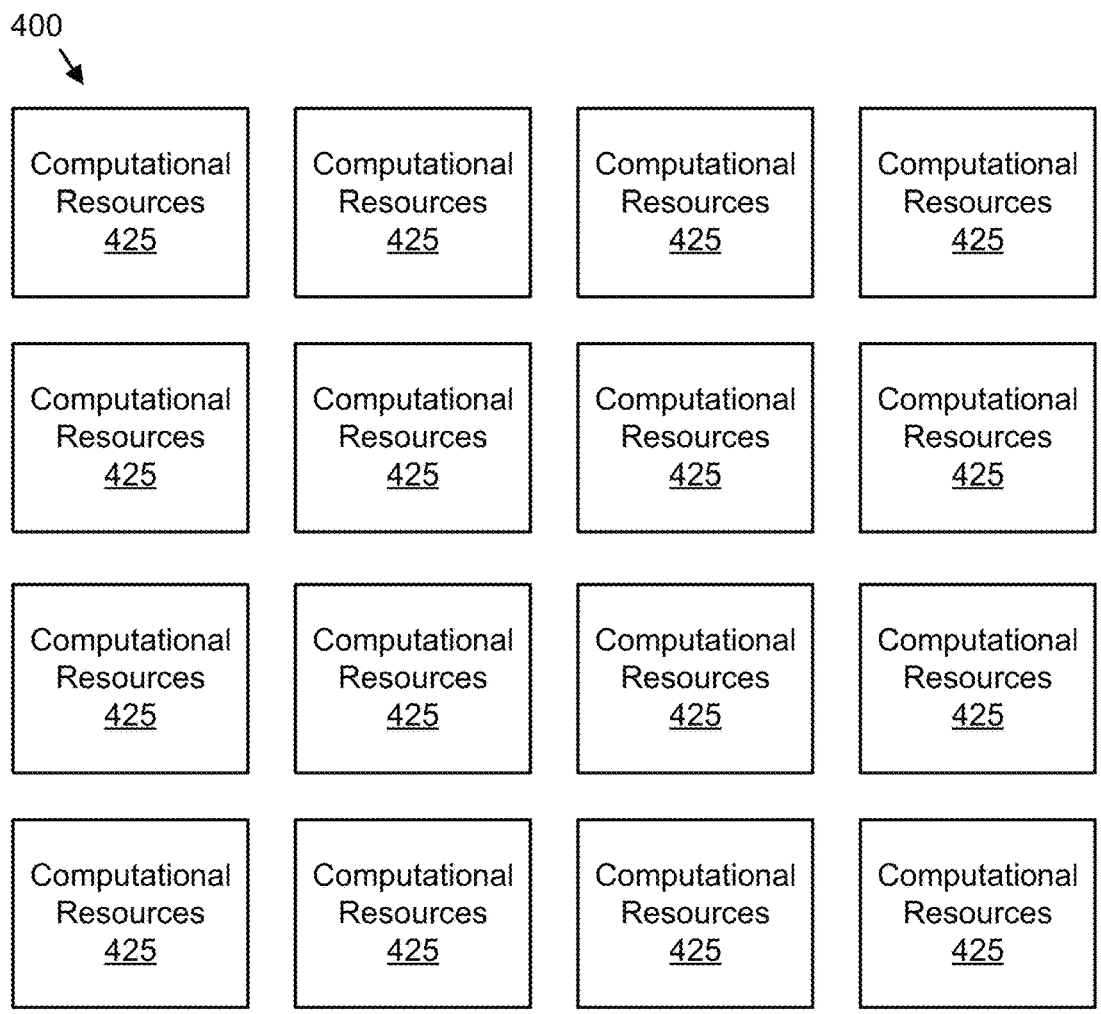
FIG. 4B is a schematic block diagram illustrating one alternate embodiment of a computer.

FIG. 4B is a schematic block diagram illustrating one alternate embodiment of a computer 400. In the depicted embodiment, the computer 400 includes a plurality of computational resources 425. In one embodiment, each computational resource 425 includes a processor 405 and a memory 410. In addition, each computational resource 425 may include communication hardware 415. The computational resources 425 required to satisfy a minimization policy may be determined and the computational resources 425 allocated that satisfy the minimization policy.

Figure 5A:
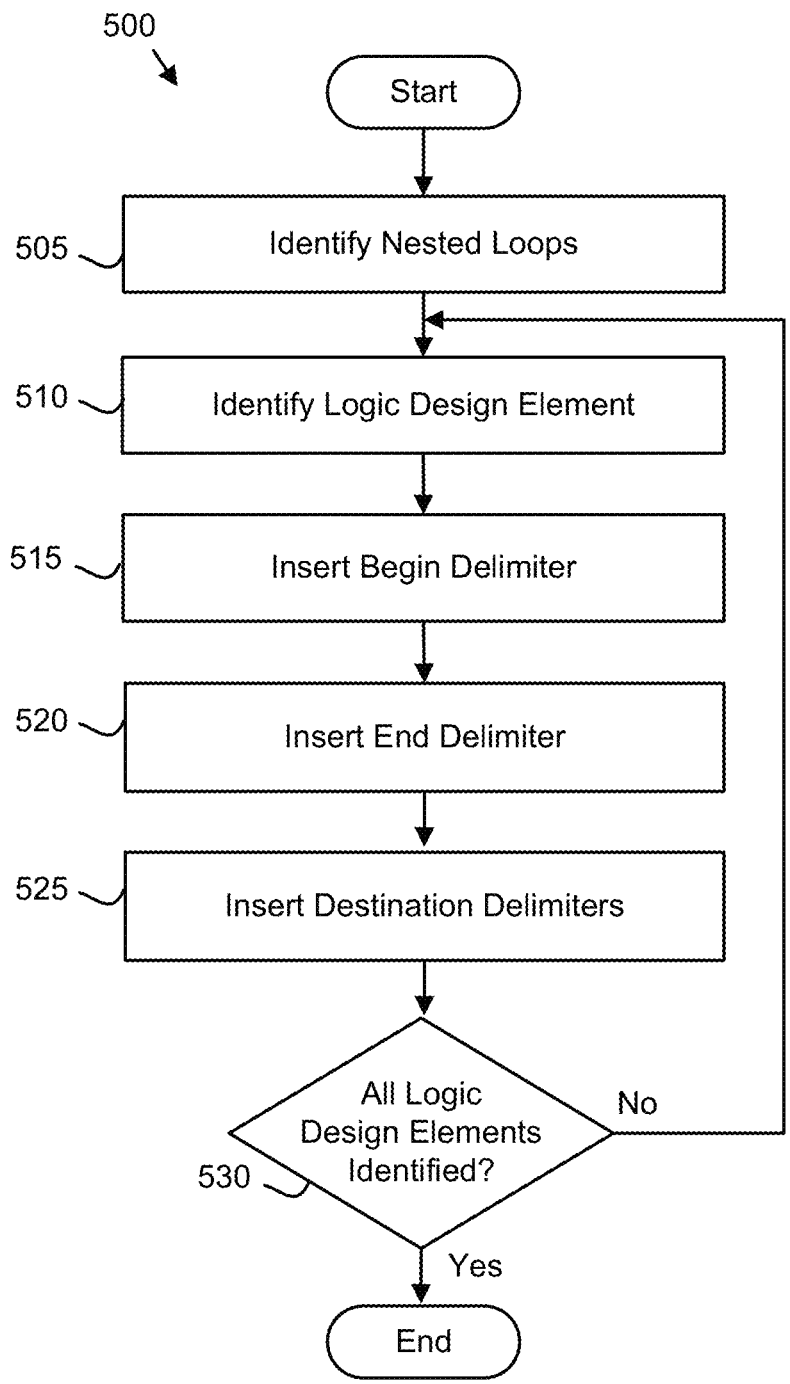
FIG. 5A is a schematic flowchart diagram illustrating one embodiment of a source code parsing method.

FIG. 5A is a schematic flowchart diagram illustrating one embodiment of a source code parsing method 500. The method 500 may be performed by the processor 405 and/or parsing module 105. Alternatively, the method 500 may be performed by the computer readable storage medium such as the memory 410. The memory 410 may store code that is executed by the processor 405 to perform the functions of the method 500.

The method 500 starts, and in one embodiment, the processor 405 identifies 505 one or more nested loops of conditional logic 172. The processor 405 may identify 505 an end for each statement of conditional logic 172.

The processor 405 may further identify 510 a logic design element 130. In one embodiment, the logic design element 130 is a next conditional statement of conditional logic 172. The processor 405 may further insert 515 a begin block delimiter 344 adjacent to the conditional statement of conditional logic 172. For example, the processor 405 may insert 515 the begin block delimiter 344 before a "switch" or "case" conditional statement of conditional logic 172.

In addition, the processor 405 may insert 520 an end block delimiter 346. The end block delimiter 346 may be inserted 520 adjacent to the corresponding end for the conditional logic 172. For example, the processor 405 may insert 520 the end block delimiter 346 after the end for a last statement of the conditional logic 172.

In one embodiment, the processor 405 inserts 525 one or more destination delimiters 348. In one embodiment, a destination delimiter 348 is inserted 525 after the statement of conditional logic 172. In addition, the destination delimiter 348 may indicate that the logic state 205 specified by the destination delimiter 348 is activated if the statement of conditional logic 172 is either satisfied or not satisfied.

In one embodiment, the destination delimiter 348 is inserted 525 adjacent to the end of the statement of conditional logic 172. The destination delimiter 348 may indicate a next logic state 205 to become active after the logic state 205 for the current statement of conditional logic 172 is completed.

The processor 405 may determine 530 if all logic design elements 130 have been identified. If all logic design elements 130 have not been identified, the processor 405 loops to identify 510 the next logic design element 130. If all logic design elements 130 have been identified, the method 500 ends.

Figure 5B:
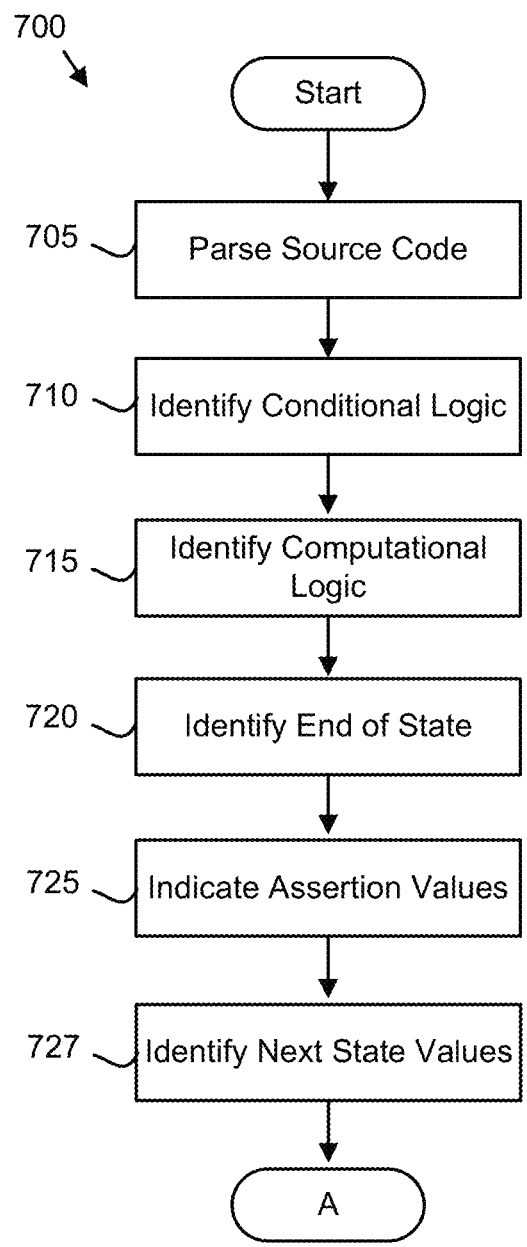
FIGS. 5B-C are a schematic flowchart diagrams illustrating one embodiment of a logic state encoding method.

FIG. 5B is a schematic flowchart diagram illustrating one embodiment of a logic state encoding method 700. The method 700 may encode the parsed source code 140 as one or more logic states 205 of the linear array 200. The method 700 may be performed by the processor 405 and/or encoding module 104. Alternatively, the method 700 may be performed by the computer readable storage medium such as the memory 410. The memory 410 may store code that is executed by the processor 405 to perform the functions of the method 700.

The method 700 starts, and in one embodiment, the processor 405 parses 705 the source code 140 of a multidimensional logical array logic design 144 into a plurality of logic design elements 130. The processor 405 may segment the source code 140 into a plurality of logic design elements 130 as described in FIG. 5A. The processor 405 may further parse 705 a plurality of white box execution blocks 131 from the source code 140.

The processor 405 may identify 710 the conditional logic 172 in each logic design element 130 from the parsed source code 140. The conditional logic 172 may be identified from the begin block delimiters 344 and the end block delimiters 346. In addition, the processor 405 may identify 710 the input data 160 for the logic transformation 150 from the conditional logic 172 and the actions 174.

In addition, the processor 405 may identify 715 computational logic 134 in each logic design element 130 from the parsed source code 140. In one embodiment, the computational logic 134 is identified from the actions 174 of the source code source code 140. The processor 405 may identify 715 the binary output variables 225 for the logic transformation 150 from the computational logic 134. In addition, the processor 405 may identify 715 the input data 160 for the logic transformation 150 from the computational logic 134.

In one embodiment, the processor 405 identifies 720 the end of state 136 for each logic design element 130. The end of state 136 may be identified from the end block delimiter 346. Alternatively, the end of state 136 may be an end of a conditional statement, an end of a sequence of instructions that are executed in response to conditional logic 172 being satisfied, or the like.

The processor 405 may indicate 725 assertion values for the binary input variables 215, the present state values 220, the binary output variables 225, and the next state values 230. In one embodiment, an assertion indicator 295 is associated with each of the binary input variables 215, the present state values 220, the binary output variables 225, and the next state values 230.

The processor 405 may identify 727 one or more next state values 230 for each logic design element 130 from the parsed source code 140. The next state values 230 for the logic transformation 150 may be identified 727 from the conditional logic 172 and the destination delimiters 348.

The processor 405 may encode 730 the logic state 205 from the logic transformation 150. In one embodiment, the logic state 205 is assigned present state values 220. The present state values 220 may be assigned to minimize the minterms 240 and the maxterms 235 that generate the present state values 220. In addition, the next state values 230 for the logic state 205 may be generated from the next state values 230 of the logic transformation 150. In one embodiment, the next state values 230 for the logic state 205 are equivalent to the next state values 230 of the logic transformation 150.

The binary input variables 215 of the logic state 205 may be generated from the binary input variables 215 of the logic transformation 150. In one embodiment, the binary input variables 215 of the logic state 205 are equivalent to the binary input variables 215 of the logic transformation 150.

The processor 405 may further encode 730 the logic state 205 by generating the minterms 240 and the maxterms 235 from the computational logic 134. In one embodiment, the minterms 240 in the maxterms 235 are structured to be logically equivalent to the computational logic 134.

The processor 405 may further assign one or more maxterms 235 to each binary output variable 225 and/or each next state value 230. Alternatively, the processor 405 may assign one or more minterms 240 to each binary output variable 225 and/or each next state value 230.

Figure 6:
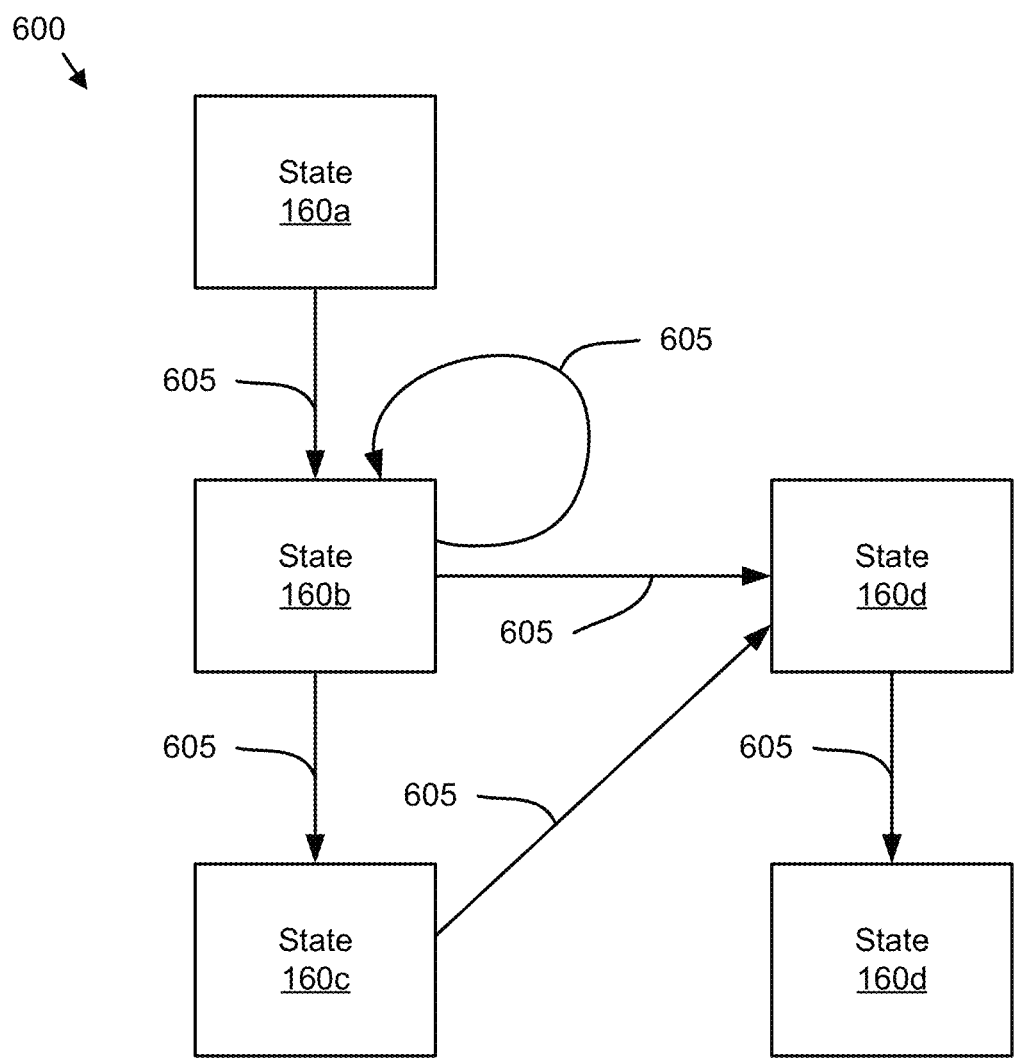
FIG. 6 is a schematic block diagram illustrating one embodiment of a state chart.

The processor 405 may organize 735 the plurality of binary input variables 215 into the plurality of fields 260/265 in the one or more combination maps 190. The plurality of logic states 205 may be displayed 740 as a plurality of fields 260/265 in one or more combination maps 190. In one embodiment, the processor 405 displays 740 the plurality of logic states 205 as a state chart 600. The state chart 600 may show transitions between each logic state 205 as shown in FIG. 6. In addition, the state chart 600 may show one or more conditions for the transitions.

The processor 405 may further identify 745 logic relationships of the logic design 144 using the one or more combination maps 190 of the linear array 200. The logic relationships may be identified from the relationship arrows 490. In the one or more combination maps 190 using the linear array 200. In addition, the processor 405 may analyze 750 the logic relationships of the logic design 144 using the one or more combination maps of the linear array 200.

The processor 405 may resolve 755 the logic relationships of the logic design 144 using the one or more combination maps 190 of the linear array 200. The processor 405 may further reduce 760 the logic relationships of the logic design 144 to a Boolean equation 126 using the one or more combination maps 190.

The processor 405 may generate 765 output from the Boolean equation 126. The output may be one of output source code 435 and a hardware implementation 495 such as semiconductor gates 445. In one embodiment, the output is executable code 440.

In one embodiment, the processor 405 may compile and execute the output source code 435 and the method 700 ends. In one embodiment, the compiled output source code 435 operates the hardware 496.

FIG. 6 is a schematic block diagram illustrating one embodiment of a state chart 600. In the depicted embodiment, the state chart 600 shows each logic state 205 is a state 160. In addition, the state chart 600 shows state transitions 605 between each state 160.

Each state 160 may perform actions 174. In addition, each state 160 may activate another state 160, including the state 260 itself, based on conditional logic 172. Activating another state 160 is shown as a state transition 605.

Figure 7A:
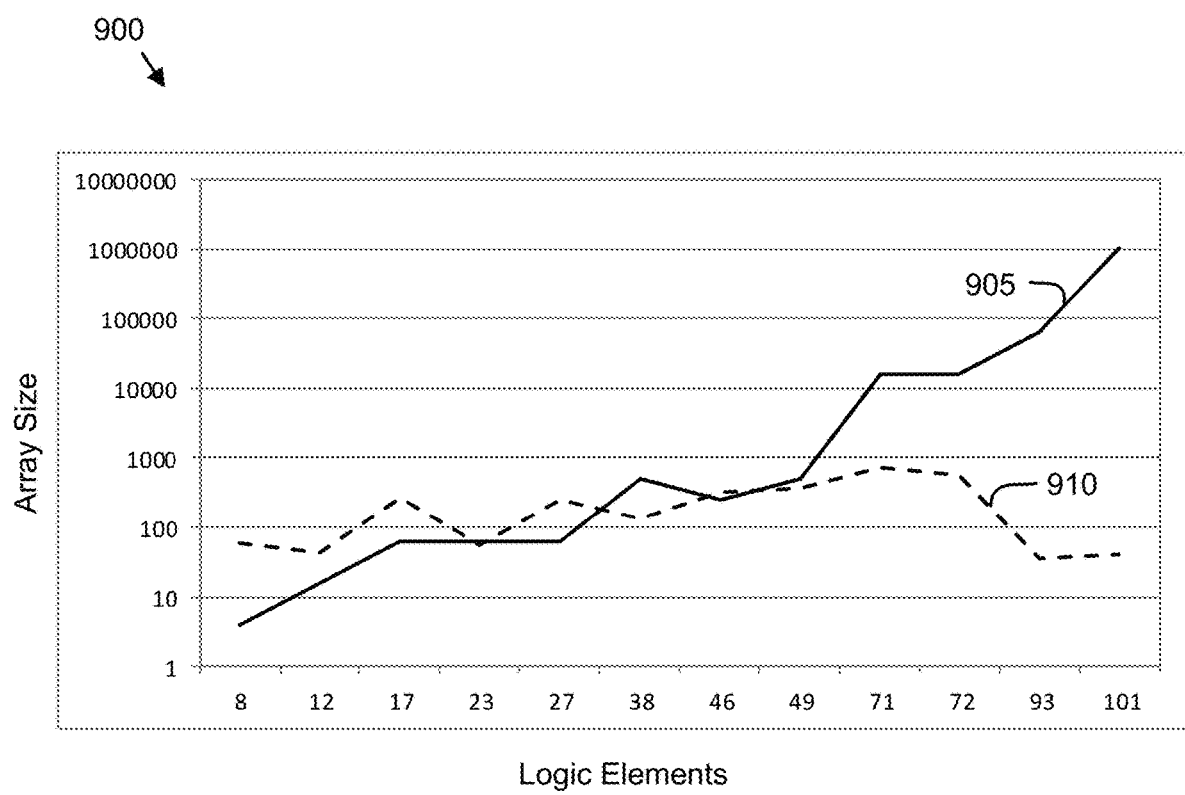
FIG. 7A is a graph illustrating one embodiment of array complexity.

FIG. 7A is a graph 900 illustrating one embodiment of array complexity. The graph 900 shows an array size 905 for a multidimensional array of the source code 140 and an array size 910 for a corresponding linear array 200 for multiple pairs of identical function implementations with various numbers of logic elements 176. For example, a first function implementation of 27 logic elements 176 may be implemented as a pair of arrays comprising a multidimensional array and a linear array 200. The array size 905, 910 is shown on a log scale. Array size 905, 910 is one measure of array complexity and a good predictor of the computational overhead required to process an array.

The graph 900 illustrates that the array size 905 for multidimensional array implementations quickly becomes orders of magnitude larger than the corresponding array size 910 for linear array implementations. By encoding the source code 140 as a linear array 200, array size is greatly reduced, reducing the computational complexity of processing the linear array 200.

Figure 7B:
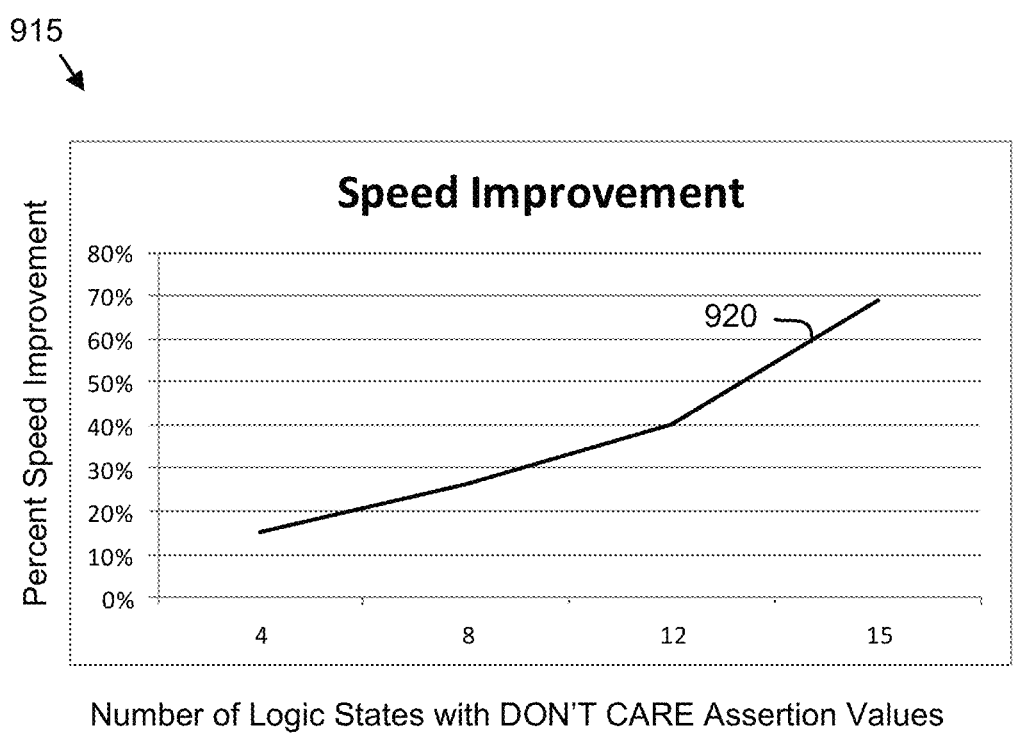
FIG. 7B is a graph illustrating one embodiment of speed improvements from identifying DON'T CARE assertion values.

FIG. 7B is a graph 915 illustrating one embodiment of speed improvements 920 from identifying DON'T CARE assertion values 290. A percentage speed improvement is shown as a result of identifying DON'T CARE assertion values 290 for minterms 240 of 4, 8, 12, and 15 logic states 205 of an exemplary linear array 200. The speed improvement 920 is calculated by comparing processing time for the exemplary linear array 200 without identifying the DON'T CARE assertion values 290, and the processing time for the exemplary linear array 200 when DON'T CARE assertion values 290 are identified for minterms 240 of 4, 8, 12, and 15 logic states 205 of the linear array 240 shown in Table 1. Table 1 shows an estimate of processing time as a function of linear array size for minterms 240 of 4, 8, 12, and 15 logic states 205 having either deasserted assertion values 290 or DON'T CARE assertion values 290.

TABLE 1

|  | 4 Logic States | 8 Logic States | 12 Logic States | 15 Logic States |
| --- | --- | --- | --- | --- |
| Deasserted | 645 | 499 | 362 | 251 |
| DON'T CARE | 547 | 369 | 216 | 78 |

Figure 8A:
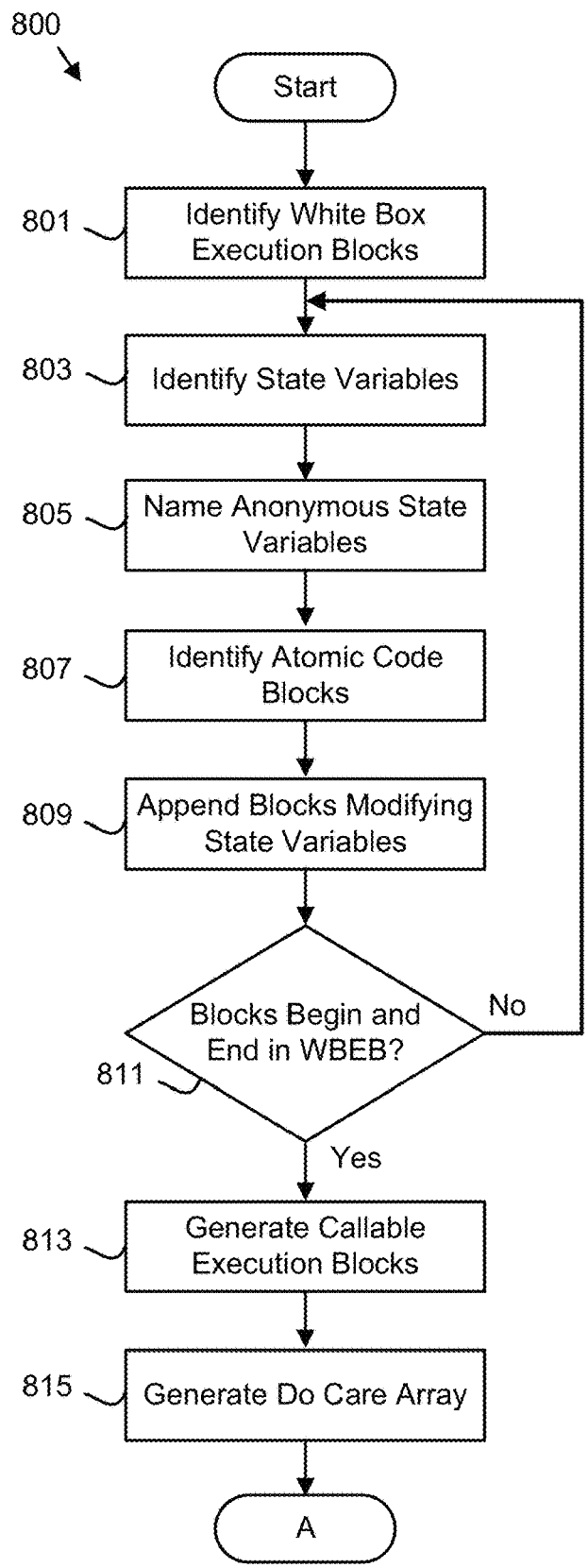
FIGS. 8A-B are a schematic flowchart diagram illustrating one embodiment of a production array implementation method.
Figure 8B:
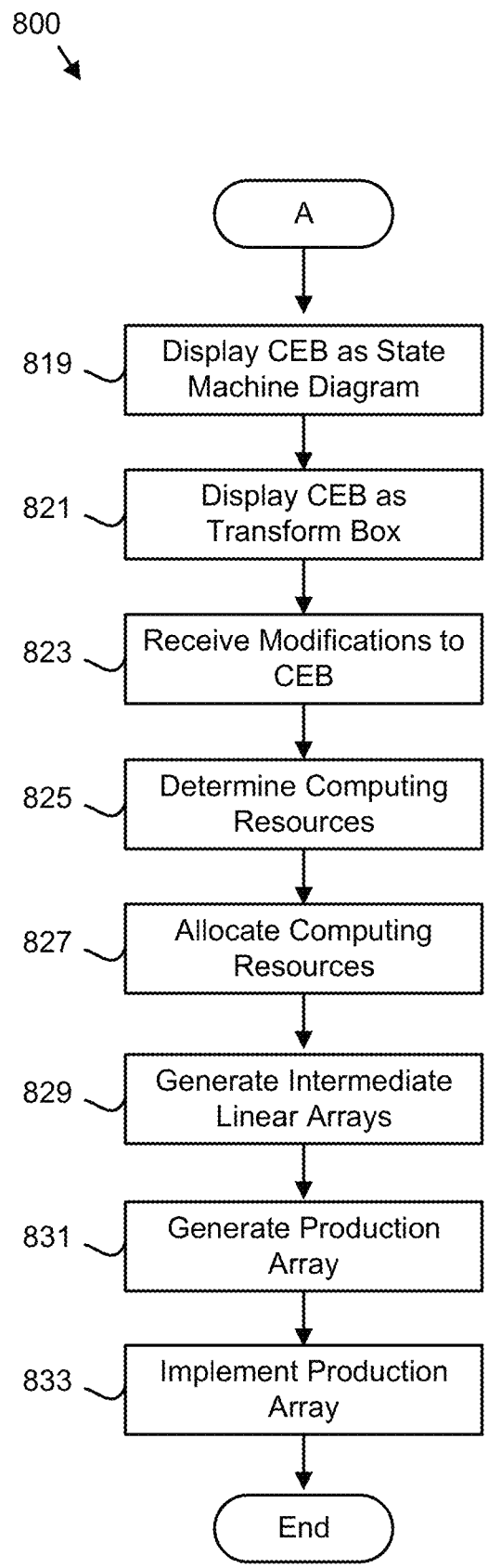

FIGS. 8A-B are a schematic flowchart diagram illustrating one embodiment of a production array implementation method 800. The method 800 may generate the white box execution blocks 131, callable blocks 151, intermediate linear arrays 153, and the production array 157. In addition, the method 800 may implement the production array 157 as one or more of output source code 435, executable code 440, and semiconductor gates 445. The method may be performed by one or more processors 405 of the computer 400.

The method 800 starts, and in one embodiment, the processor 405 identifies 801 a plurality of white box execution blocks 131 in the source code 140. Each white box execution block 131 may be delimited by a begin block delimiter 344 and an end block delimiter 346. The plurality of white box execution blocks 131 may be identified 801 from the parsed logic design of step 705 of FIG. 5B.

The processor 405 may identify 803 the state variables 133 for each white box execution block 131. In addition, the processor 405 may name 805 anonymous state variables 133. The anonymous state variables 133 may be intermediate values without a given name in the source code 140.

The processor 405 may identify 807 a plurality of logically atomic code blocks 341. Each logically atomic code block 341 may be a collection of SLOC 173 that is executed sequentially from her, and logical condition 172. The processor 405 may further append 809 each logically atomic code block 341 that modifies a given white box execution block 131 to the given white box execution block 131.

The processor 405 may determine 811 if each logically atomic code block 341 that begins within the given white box execution block 131 also ends within the given white box execution block 131. If each logically atomic code block 341 that begins within the given white box execution block 131 does not end within the white box execution block 131, the processor 405 may loop to further identify 803 state variables 133 for the white box execution block 131 that would incorporate a logically atomic code block 341 that begins within the white box execution block 131 but does not end within the white box execution block 131.

If each logically atomic code block 341 that begins within the given white box execution block 131 does end within the white box execution block 131, the processor 405 generates 813 a callable execution block 151 for each white box execution block 131. The callable execution block 151 includes a next state value 230 and binary output variables 225 for each combination of a present state values 220 and all binary input variables 215. In one embodiment, each next state value 230 comprises specified values for all state variables 133. The use of the callable execution block 151 reduces the computational resources 425 required to calculate the intermediate linear array 153.

The processor 405 may generate a do care array 139 for each callable execution block 151. Each do care array 139 may further reduce the computational resources 425 required to calculate the intermediate linear array 153.

In one embodiment, the processor 405 displays 819 one or more callable execution blocks 151 as a finite state machine diagram 149. In addition, the processor 405 may display 821 the one or more callable execution blocks 151 as one or more transform boxes 330. The processor 405 may receive 823 modifications to the one or more callable execution blocks 151 through the finite state machine diagrams 149 and/or the transform boxes 330.

The processor 405 may determine 825 the computational resources 425 required to satisfy a minimization policy for minimizing the callable execution blocks 151 and/or intermediate linear arrays 153. The minimization policy may be based on the number of minterms 240 associated with the callable execution blocks 151. In one embodiment, the minimization policy MP is satisfied if Equation 1 is satisfied, where CR is a number of computational resources 425.

$$MP \le \sqrt{CR} \qquad \text{Equation 1}$$

The processor 405 may allocate 827 computational resources 425 to satisfy the minimization policy. The processor 405 may employ the computational resources 425 to generate 829 the intermediate linear arrays 153 from the callable execution blocks 151. The processor 405 may further employ the computational resources 425 to generate 831 the production array 157. In one embodiment, the production array 157 is generated 831 by minimizing the intermediate linear arrays 153. The intermediate linear arrays 153 may be minimized with a Quine-McClusky algorithm.

Figure 5C:
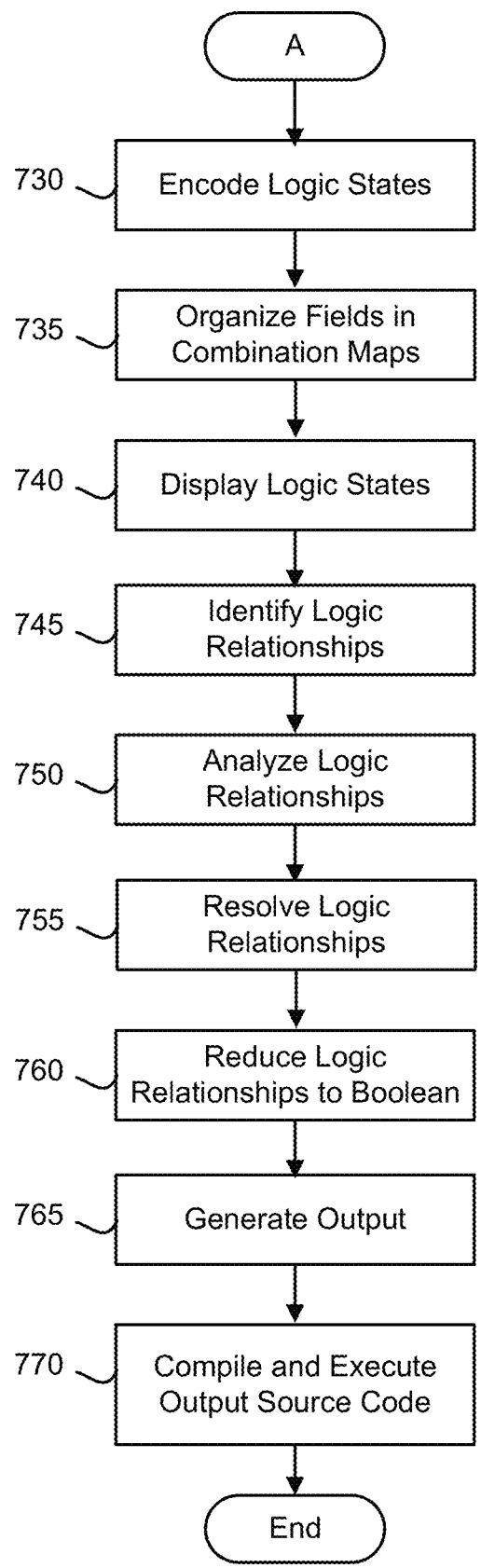

The processor 405 may implement 833 the production array 157. The production array 157 may be implemented 833 as semiconductor gates 445. In addition, the production array 157 may be implemented 833 as minimized hardware output source code 435 such as a Verilog file. The production array 157 may be implemented 833 as minimized output source code 435. The minimized output source code 435 may be compiled and used to operate hardware 496 as described in step 770 of FIG. 5C. In addition, the production array 157 may be implemented 833 as executable code 440. The executable code 440 may be used to operate the hardware 496.

Figure 9:
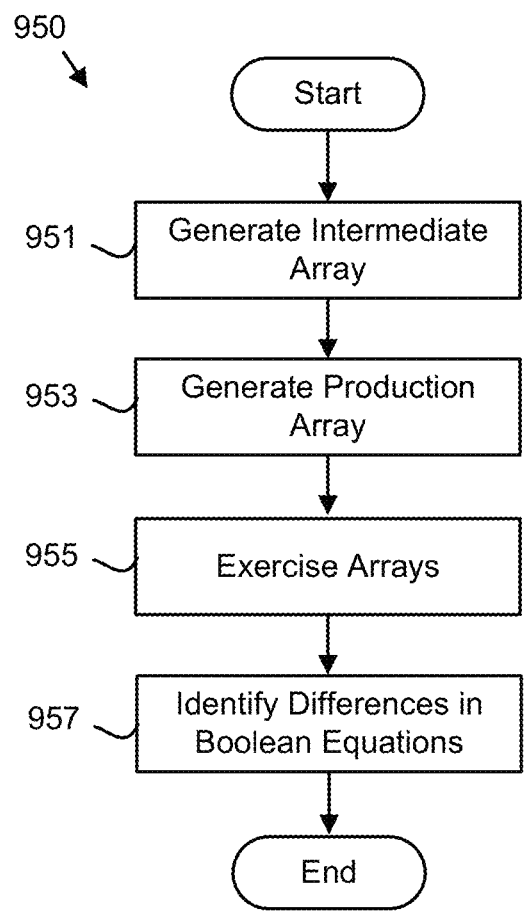
FIG. 9 is a schematic flowchart diagram illustrating one embodiment of a difference identification method.

FIG. 9 is a schematic flowchart diagram illustrating one embodiment of a difference identification method 950. The method 950 may identify differences in state variables 133 and binary output variables 225 between an intermediate linear array 153 and a production array 157. The method 950 may be performed by one or more processors 405 of the computer 400.

The method 950 starts, and in one embodiment, the processor 405 generates 951 at least one intermediate linear array 153. The at least one intermediate linear array 153 may be generated 951 as described in step 829 of FIG. 8B. The processor 405 further generates 953 the production array 157. The production array 157 may be generated 953 as described in step 831 of FIG. 8B.

The processor 405 may exercise 955 the at least one intermediate linear array 153 and the production array 157 by assigning present state values 220 and binary input variables 215 to each array 153/157. The processor 405 may further identify 957 differences between the activation of the logically atomic code block 341 and/or the Boolean equations of the at least one intermediate linear array 153 and the production array 157 and the method 950 ends.

The embodiments may include a method of implementing a production array comprising:

identifying, by use of a processor 405, a plurality of white box execution blocks 131 in source code 140, wherein each white box execution block 131 is delimited by a begin block delimiter 344 and a block end delimiter 346.

identifying state variables 133 for each white box execution block 131, wherein each state variable 133 is Boolean, is only modified by the corresponding white box execution block 131, and is modified at least once by the corresponding white box execution block 131;

identifying a plurality of logically atomic code blocks 341, wherein each logically atomic code block 341 is a collection of SLOC 173 that is executed sequentially from a common logical condition 172;

appending each logically atomic code block 341 that modifies a given white box execution block 131 to the given white box execution block 131, wherein each logically atomic code block 341 that begins within the given white box execution block 131 ends within the given white box execution block 131;

generating a callable execution block 151 for each white box execution block 131, wherein the state variables 133 for callable execution block comprise callable source code parameters 137 and are globally maintained, and the callable execution block 151 generates a next state value 230 and binary output variables 225 for each combination of a present state values 220 and all binary input variables 215, wherein each next state value 230 comprises specified values for all state variables 133;

generating a do care array 139 for each callable execution block 151, wherein each do care array 139 comprises a dimension 138 for all present state values 220 and each binary input variable 215 of the callable execution block 131 and a binary do care/don't care value 141 for each combination of present state values 220 and binary input variable instances 215;

displaying a behavior of a given callable execution block 151 as a finite state machine diagram 149;

displaying the behavior of the given callable execution block 151 as a transform box 330 showing binary input variables 215, binary output variables 225, present state values 220 and next state values 230 with the associated Boolean sum of products of product of sums equation for each state variable 133 and each binary output variables 225;

receiving modifications to one or more callable execution blocks 151;

generating the binary output variables 225 and computed next state values 230 for each combination of present state values 220 and binary input values 215 into an intermediate linear array 153, while excluding those combinations of binary input values 215 that are don't cares.

generating a minimized production array 157 from the intermediate linear array 153; and implement the production array 157.

In one embodiment for the method of implementing the production array 157, the intermediate linear array 153 comprises a logic state 205 for callable execution block 151, each logic state 205 comprising one or more binary output variables 225, one or more binary input variables 215, one or more minterms 240 of the one or more binary input variables 215, one or more maxterms 235 of the one or more minterms 240, one or more present state values 220, and one or more next state values 230.

In one embodiment for the method of implementing the production array 157, the production array 157 is implemented as semiconductor gates.

In one embodiment for the method of implementing the production array 157, the production array 157 is implemented as one of minimized hardware and software source code.

In one embodiment for the method of implementing the production array 157, the production array 157 is implemented as executable code.

In one embodiment for the method of implementing the production array 157, the method further comprises exercising the intermediate linear array 153 and the production array 157; and identifying differences in state variables 133 and binary output values 225 between the intermediate linear array 153 and the production array 157.

In one embodiment for the method of implementing the production array 157, the method further comprises determining computational resources 425 required to satisfy a minimization policy; and allocating the required computational resources 425.

In one embodiment for the method of implementing the production array 157, the method further comprises naming anonymous state variables with a unique identifier.

The method of implementing the production array 157 may also be implemented as a program product and an apparatus.

The embodiments parsed source code into a plurality of logic design elements 130. In addition, the embodiments identify the conditional logic 172 in the computational logic 174 for each logic design element 130. The embodiments encode each logic design element 130 as a logic state 205 in the linear array 200. Because of the reduced complexity of the linear array 200, the source code is more easily analyzed and manipulated.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
parsing, by use of a processor, source code of a multidimensional logical array logic design into a plurality of logic design elements, wherein each logic design element comprises a logically atomic code block between conditional logic that does not contain a conditional logic;
identifying conditional logic for each logic design element from the parsed source code;
identifying computation logic for each logic design element from the parsed source code;
identifying one or more next state values for each logic design element from the parsed source code;
encoding each logic design element of the multidimensional logical array logic design as a logic state of a plurality of logic states in a linear array, wherein the plurality of logic states are displayed as a plurality of fields in one or more combination maps;
organizing the plurality of binary input variables into the plurality of fields in the one or more combination maps;
identifying logic relationships of the logic design from relationship arrows in the one or more combination maps using the linear array;
analyzing the logic relationships of the logic design using the one or more combination maps of the linear array; and
resolving the logic relationships of the logic design using the one or more combination maps of the linear array, wherein a linear array size is reduced;
reducing the logic relationships of the reduced logic design to a Boolean equation using the one or more combination maps;
generating one of minimized output source code and a minimized hardware implementation from the Boolean equation representation of the source code.

2. The method of claim 1, the method further comprising:
compiling the output source code;
operate hardware with the compiled output source code.

3. The method of claim 1, the method further comprising displaying the plurality of logic states as a state chart.

4. The method of claim 1, wherein parsing the source code comprises identifying nested loops.

5. The method of claim 4, wherein parsing the source code further comprises:
identifying a first logic design element;
inserting a begin block delimiter;
inserting an end block delimiter; and
inserting a destination delimiter.

6. The method of claim 1, wherein each field of the plurality of fields corresponds to a respective display level of a multi-level display format having a top display level combination map and at least one lower display level combination map and the plurality of fields are further organized by:
selecting a first field of the plurality of fields, the first field corresponding to a first display level;
identifying combinations of the binary input variables of a successive combination map that logically defines the first field of the plurality of fields, wherein the successive combination map is at a successive display level lower than the first display level;
displaying at each successive display level, combination maps of additional binary input variables that logically define the first field at each successive level until a last display level is reached; and
converting the combination of binary input variables for each display level into a logical expression.

7. A program product comprising a non-transitory computer readable storage medium storing code executable by a processor to perform:
parsing source code of a multidimensional logical array logic design into a plurality of logic design elements, wherein each logic design element comprises a logically atomic code block between conditional logic that does not contain a conditional logic;
identifying conditional logic for each logic design element from the parsed source code;
identifying computation logic for each logic design element from the parsed source code;
identifying one or more next state values for each logic design element from the parsed source code;
encoding each logic design element of the multidimensional logical array logic design as a logic state of a plurality of logic states in a linear array, wherein the plurality of logic states are displayed as a plurality of fields in one or more combination maps;
organizing the plurality of binary input variables into the plurality of fields in the one or more combination maps;
identifying logic relationships of the logic design from relationship arrows in the one or more combination maps using the linear array;
analyzing the logic relationships of the logic design using the one or more combination maps of the linear array; and
resolving the logic relationships of the logic design using the one or more combination maps of the linear array, wherein a linear array size is reduced;
reducing the logic relationships of the reduced logic design to a Boolean equation using the one or more combination maps;
generating one of minimized output source code and a minimized hardware implementation from the Boolean equation representation of the source code.

8. The program product of claim 7, the processor further:
compiling the output source code;
operate hardware with the compiled output source code.

9. The program product of claim 7, the processor further displaying the plurality of logic states as a state chart.

10. The program product of claim 7, wherein parsing the source code comprises identifying nested loops.

11. The program product of claim 10, wherein parsing the source code further comprises:
identifying a first logic design element;
inserting a begin block delimiter;
inserting an end block delimiter; and
inserting a destination delimiter.

12. The program product of claim 7, wherein each field of the plurality of fields corresponds to a respective display level of a multi-level display format having a top display level combination map and at least one lower display level combination map and the plurality of fields are further organized by:

selecting a first field of the plurality of fields, the first field corresponding to a first display level;

identifying combinations of the binary input variables of a successive combination map that logically defines the first field of the plurality of fields, wherein the successive combination map is at a successive display level lower than the first display level;

displaying at each successive display level, combination maps of additional binary input variables that logically define the first field at each successive level until a last display level is reached; and converting the combination of binary input variables for each display level into a logical expression.

13. An apparatus comprising:

a processor:

a memory storing code executable by a processor to perform:

parsing source code of a multidimensional logical array logic design into a plurality of logic design elements, wherein each logic design element comprises a logically atomic code block between conditional logic that does not contain a conditional logic;

identifying conditional logic for each logic design element from the parsed source code;

identifying computation logic for each logic design element from the parsed source code;

identifying one or more next state values for each logic design element from the parsed source code;

encoding each logic design element of the multidimensional logical array logic design as a logic state of a plurality of logic states in a linear array, wherein the plurality of logic states are displayed as a plurality of fields in one or more combination maps;

organizing the plurality of binary input variables into the plurality of fields in the one or more combination maps;

identifying logic relationships of the logic design from relationship arrows in the one or more combination maps using the linear array;

analyzing the logic relationships of the logic design using the one or more combination maps of the linear array; and resolving the logic relationships of the logic design using the one or more combination maps of the linear array, wherein a linear array size is reduced;

reducing the logic relationships of the reduced logic design to a Boolean equation using the one or more combination maps;

generating one of minimized output source code and a minimized hardware implementation from the Boolean equation representation of the source code.

14. The apparatus of claim 13, the processor further:

compiling the output source code;

operate hardware with the compiled output source code.

15. The apparatus of claim 13, the processor further displaying the plurality of logic states as a state chart.

16. The apparatus of claim 13, wherein parsing the source code comprises identifying nested loops.

17. The apparatus of claim 16, wherein parsing the source code further comprises:

identifying a first logic design element;

inserting a begin block delimiter;

inserting an end block delimiter; and inserting a destination delimiter.

* * * * *